US006860347B2

(12) United States Patent
Sinclair et al.

(10) Patent No.: US 6,860,347 B2
(45) Date of Patent: Mar. 1, 2005

(54) WHEELCHAIR DRIVE UNIT

(75) Inventors: Clive Marles Sinclair, London (GB); Alexander Joseph Kalogroulis, Coulsdon (GB)

(73) Assignee: Daka Research Inc., Tortola (VG)

( * ) Notice: Subject to any disclaimer, the term of this patent is extended or adjusted under 35 U.S.C. 154(b) by 138 days.

(21) Appl. No.: 10/291,071

(22) Filed: Nov. 7, 2002

(65) Prior Publication Data

US 2003/0089537 A1 May 15, 2003

(30) Foreign Application Priority Data

Nov. 9, 2001 (GB) ............................................ 0126989

(51) Int. Cl.[7] .......................... B62B 13/18; B62B 13/00

(52) U.S. Cl. ............................ 180/11; 180/12; 180/15; 280/304.1

(58) Field of Search ........................... 180/65.1, 11, 12, 180/13, 65.3, 907, 65.6, 15, 22, 65.5; 280/304.1

(56) References Cited

U.S. PATENT DOCUMENTS

| | | | | | |
|---|---|---|---|---|---|
| 2,495,573 | A | * | 1/1950 | Duke | 180/11 |
| 2,544,831 | A | * | 3/1951 | Guyton | 180/6.62 |
| 3,905,437 | A | * | 9/1975 | Kaiho et al. | 180/15 |
| 4,386,672 | A | * | 6/1983 | Coker | 180/13 |
| 4,759,418 | A | * | 7/1988 | Goldenfeld et al. | 180/65.1 |
| 4,962,942 | A | * | 10/1990 | Barnett et al. | 280/5.28 |
| 5,016,720 | A | * | 5/1991 | Coker | 180/13 |
| 5,113,959 | A | * | 5/1992 | Mastov et al. | 180/11 |
| 5,135,063 | A | * | 8/1992 | Kropf | 180/13 |
| 5,222,567 | A | * | 6/1993 | Broadhead et al. | 180/15 |
| 5,291,959 | A | * | 3/1994 | Malblanc | 180/11 |
| 5,351,774 | A | * | 10/1994 | Okamoto | 180/65.1 |
| 5,494,126 | A | * | 2/1996 | Meeker | 180/13 |
| 5,651,422 | A | * | 7/1997 | Casali | 180/13 |
| 5,826,670 | A | * | 10/1998 | Nan | 180/15 |
| 6,334,497 | B2 | * | 1/2002 | Odell | 180/65.1 |
| 6,360,836 | B1 | * | 3/2002 | Milano et al. | 180/65.6 |
| 6,481,514 | B2 | * | 11/2002 | Takada | 180/11 |
| 6,578,860 | B1 | * | 6/2003 | Chang | 280/250.1 |
| 6,702,051 | B2 | * | 3/2004 | Chu et al. | 180/13 |
| 6,729,422 | B2 | * | 5/2004 | Chu et al. | 180/13 |

FOREIGN PATENT DOCUMENTS

| | | | | |
|---|---|---|---|---|
| EP | 0236029 | | 9/1987 | |
| EP | 0419085 | | 9/1990 | |
| GB | 2223994 | * | 4/1990 | B60K/1/00 |

* cited by examiner

*Primary Examiner*—Christopher P. Ellis
*Assistant Examiner*—J. Allen Shriver
(74) *Attorney, Agent, or Firm*—Curtis L. Harrington

(57) ABSTRACT

An electric drive attachment for a wheelchair comprising a drive housing containing an electric motor, a drive wheel which touches the ground and drives the wheelchair through frictional contact with the ground and speed reducing mechanism between the motor and drive wheel, attachment structure to attach the wheelchair drive unit to the wheelchair as a pair of clamps one on each side of the frame. Also included are torque dampening systems to reduce the shock of starting the motor, a clutch which enables manual forward movement of a wheelchair without engagement of the motor and without dragging of the drive wheel, an under run wheel and positive pressurization of the gear works and area surrounding the drive wheel to keep the housing free of debris.

13 Claims, 17 Drawing Sheets

WHEELCHAIR DRIVE UNIT

FIELD OF THE INVENTION

This invention relates to an improved electric drive attachment for a conventional wheelchair.

BACKGROUND OF THE INVENTION

Wheelchair drive units are well known accessories and fall into two distinct categories. The first category is mounted on the wheelchair and drives the tire of one or more wheelchair wheels. The second category, into which the present invention falls, is attached to the wheelchair and has one or more independent drive wheels which rest on and drive against the ground.

It is the action of the drive wheels on the ground which can cause the user problems when they need to negotiate kets or pot holes. While it is known to raise the drive wheel off the ground surface by the use of a cable and lever or screw jack arrangement, these structures and methods are difficult to use or result in minimal ground clearance when actuated.

SUMMARY OF THE INVENTION

According to the present invention there is provided an electric drive attachment for a wheelchair comprising a drive housing containing an electric motor, a drive wheel which touches the ground and drives the wheelchair through frictional contact with the ground and speed reducing mechanism between the motor and drive wheel, attachment structure to attach the wheelchair drive unit to the wheelchair, said attachment structure preferably being a pair of clamps one on each side of the frame, each clamp containing a pivoting hinge which can be withdrawn from the clamp by aligning a tang on the pivot with a groove in the clamp, the axis of the hinge being parallel to the axis of the wheelchair rear wheels, two connecting struts of adjustable length fitted between the pivoting hinges and the drive housing, said connecting structure being in the shape of a 'V' so that the drive housing sits centrally between the two clamps and is free to pivot at the clamps on the aforementioned axis and each end of the struts able to pivot in the plane of the 'V' so that the 'V' can open and close and with the ends of the struts at the drive housing incorporating meshing gear teeth so that the struts mesh with each other and therefore open equally about a centerline between them, and such that an angle between the drive wheel ground contact point and the center of the axis of the pivoting hinges, and a vertical line through the center of the pivoting hinges is about 35 degrees, a visible mark on the drive housing that, when vertical, indicates the aforementioned angle is correct. A flexible length adjustable connector that ties the two struts to each other near the clamps thereby limits the extent to which the struts can open and limiting the forces the struts can impose on the frame. A lifting strap of adjustable length is provided which attaches to the drive unit and has a loop at the other end that slips over and is secured by a wheelchair handle. The lifting strap incorporates a shortening device that effectively shortens the length of the lifting strap when activated to thereby raise the drive housing and drive wheel off the ground. The lifting strap also affording a way to quickly raise the drive housing and drive wheel substantially clear of the ground by simply pulling upwards. The lifting strap also acts to stop the drive unit and drive wheel from under running the wheelchair by restricting the degree to which the drive unit can pivot about the pivoting hinges. An optional anti under run roller can also be utilized to further limit the angle which the drive unit can achieve with respect to the ground surface.

Also included are torque dampening systems to reduce the shock of starting the motor, a clutch which enables manual forward movement of a wheelchair without engagement of the motor and without dragging of the drive wheel, an anti under run roller that limits the degree to which the wheelchair drive unit can under run the wheelchair and positive pressurization of the gear works and area surrounding the drive wheel to keep the housing free of debris.

BRIEF DESCRIPTION OF THE DRAWINGS

A specific embodiment of the invention will now be described by way of example with reference to the accompanying drawings. Further details of its configuration, construction, and operation will be best further described in the following detailed description, taken in conjunction with the accompanying drawings in which.

DETAILED DESCRIPTION OF THE PREFERRED EMBODIMENT

Figure 1:
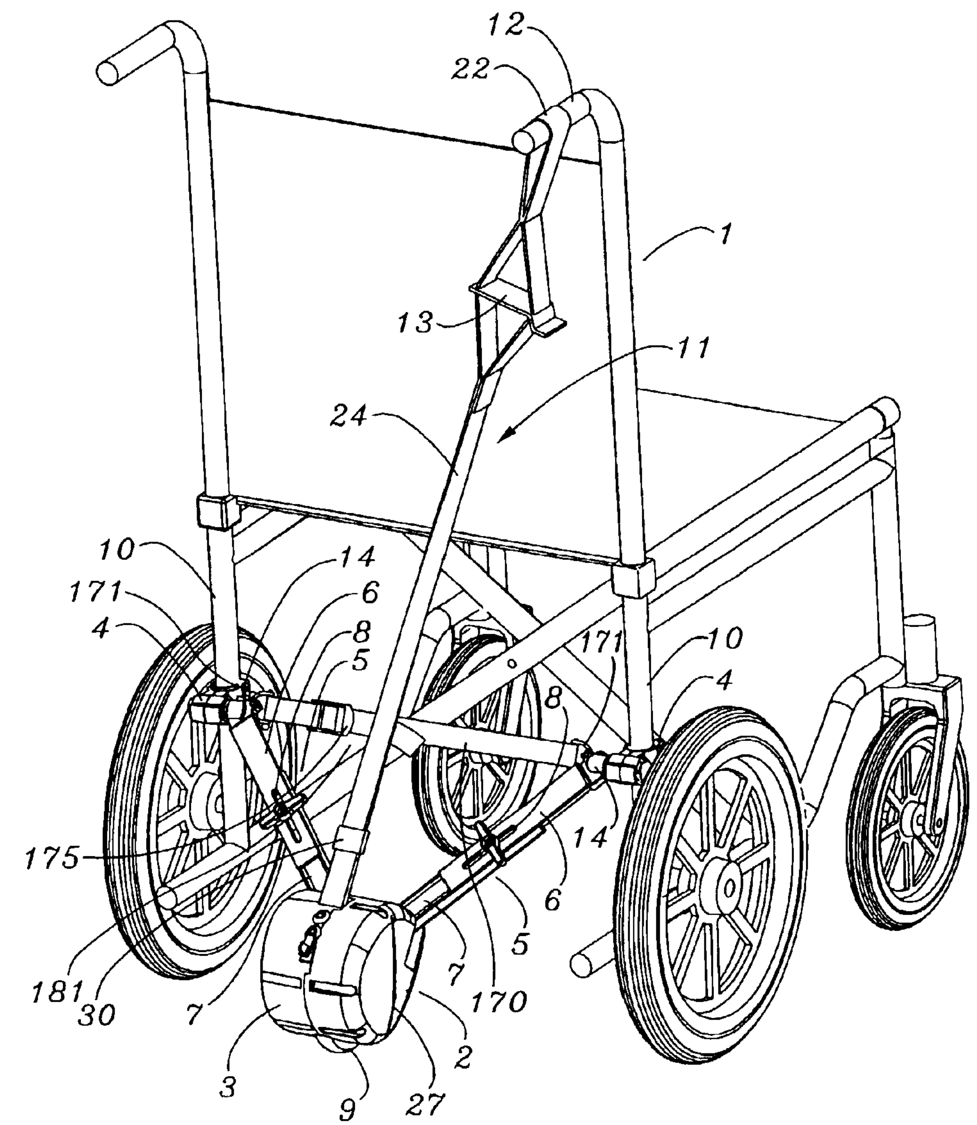
FIG. 1 shows in perspective the wheelchair drive unit fitted to an unfolded wheelchair and in a position ready for use and illustrating a horizontal strap extending between the strut pivot connection positions.

Referring to FIG. 1, a wheelchair 1 is shown as having an attached wheelchair drive unit 2 having an outer drive housing 3, attachment clamps 4, and adjustable struts 5 which position the drive unit 2 at the center of the wheelchair 1. Wheelchair 1 is of the small wheel type where the rear wheel has a smaller diameter and an axis of pivot mounted lower with respect to the chair occupant.

Adjustable struts 5 are each assembled from a clamp half strut 6 and a drive housing half strut 7. The length of each strut 5 can be locked off via wing nut 8 and a bolt (not shown). Drive wheel 9 is seen at the bottom of drive unit 2. Also note, as is seen in a numbering sequenced for FIG. 10, a tie strap 170 is seen as being connected to each clamp half strut 6 near the clamp 4 via connecting shackles 171. An adjuster 175 allows the tie strap 170 to be shortened or lengthened to suit different wheelchair 1 sizes and may limit the extent to which struts 5 can open.

Wheelchair 1 is seen as having near vertical frame members 10 which will hereinafter be referred to as frame 10 as it is the aspect of the frame to which the wheelchair drive unit 2 attaches as seen in FIG. 1. The attachment may differ where a different wheelchair 1 is utilized. A lifting strap 11, adjustable in length by strap adjuster 13, can be used with an adjuster (discussed more fully below) and is shown as extending from the wheelchair drive unit 2 outer drive housing 3 to a wheelchair handle 12. Wheelchair handle 12 can be any structure which can secure lifting strap 11, and the wheelchair handle 12 was chosen in the view of FIG. 1 due to its prominence and engage ability.

Lifting strap 11 is shown as having two stable positions. The configuration of lifting strap 11 and lifter actuator 13 is to provide a mechanically advantaged method of disengaging the drive unit 2 from the ground so that such disengaging lifting can be lifted by the wheelchair occupant easily.

The wheelchair unit 2 is also made for quick and easy complete disengagement from the wheelchair 1. Clamp half strut 6 is connected to a removable pivot 14. The removable pivot has a cylindrical portion extending into attachment clamp 4. Withdrawal of the removable pivot 14 from the attachment clamp 4, along with simple disconnection of the lifting strap 11 from the wheelchair handle 12 will complete the mechanical detachment from the wheelchair 1.

Generally, with reference to FIG. 1, the attachment clamps 4 which house removable pivots 14 are each fastened to the wheelchair frame 10 using standard fasteners (not shown). The pivots 14 are free to rotate within the clamps 4. The clamp half strut 6 is also able to pivot within the pivot 14.

Figure 2:
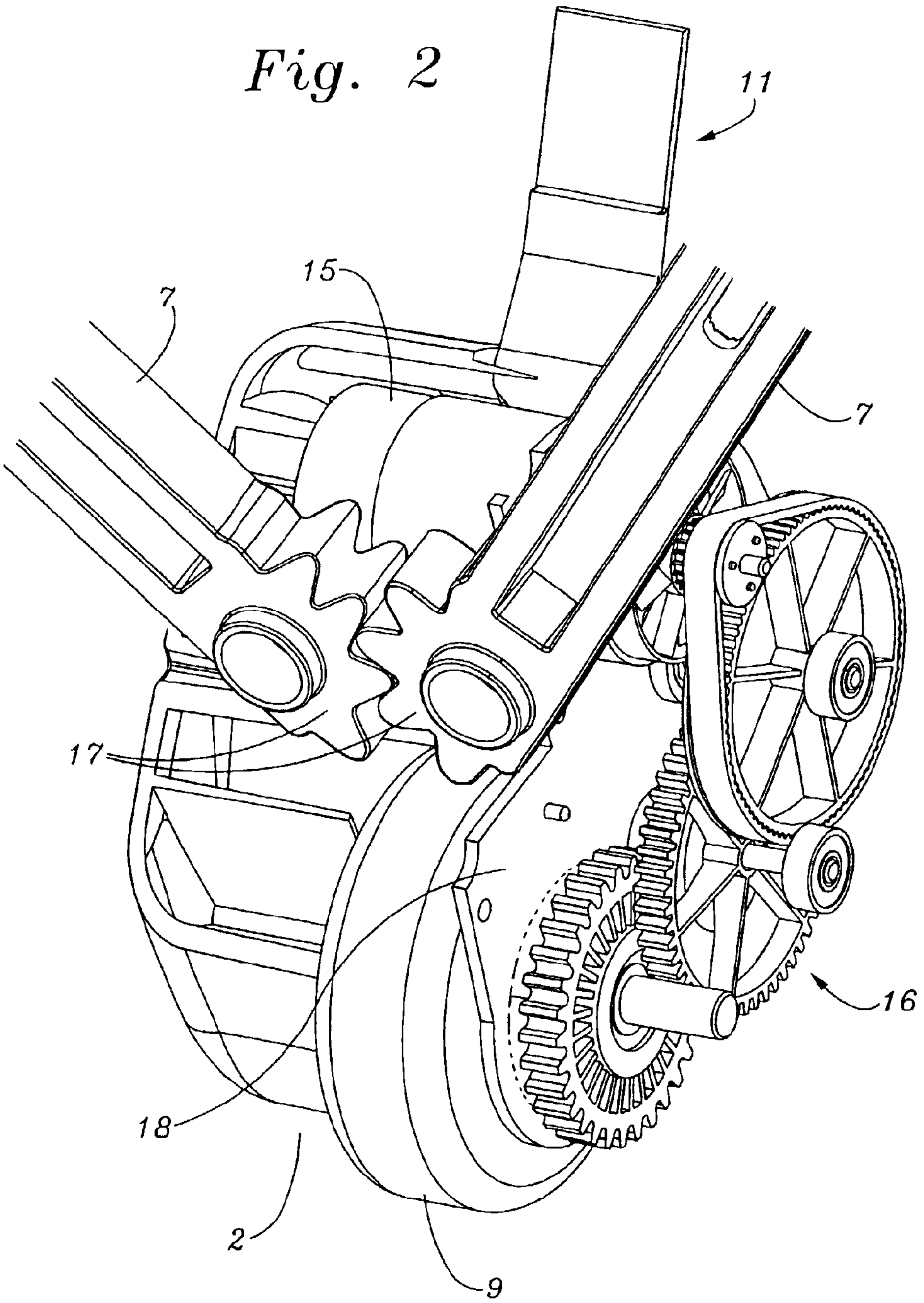
FIG. 2 shows a perspective a cut away view of the drive unit seen in FIG. 1 from a bottom perspective, with a bottom housing of the drive unit removed to expose the internals.

Referring to FIG. 2, an exposed bottom side view of the drive unit 2 is seen with a bottom portion of a housing case (not seen) removed. Prominently seen is a motor 15 with a speed reducing mechanism 16 which may include belts and gears as shown. Meshing gears 17 are seen connecting the drive housing half struts 7 so that they angularly expand about the drive unit 2 at its midpoint. As such that attachments of the struts 5 to any object will automatically center the drive unit 2 at the center of objects, and in this case the wheelchair 1 when the struts 5 are adjusted to have equal length. For wheelchair 1, centering will cause the wheelchair 1 to be driven from the center and should drive the wheelchair 1 straight unless some other force or factor is at play.

Also seen is a inner drive housing 18 which provides the physical support for the motor 15, and speed reducing mechanism 16. A set of pivot supports not shown anchor the meshing gears 17 to the outer drive housing 3. For clarity, electrical details have been omitted.

Generally, with regard to FIG. 2, the drive housing half strut 7 is able to pivot within the drive housing 2 and operate the meshing gears 17 at the end of each drive housing half strut 7. This ensures that both halves pivot at the same angular rate with respect to the drive housing 2. FIG. 2 also shows the general compact relationship of drive wheel 9, motor 15 and speed reducing mechanism 16 within the cut away inner drive housing 18.

The effect of pivots 14 is to allow the drive unit 2 and struts 5 to pivot up and down relative to the road surface. The effect of the pivots at the end of the clamp half struts 6 the pivots at the end of the drive housing half struts 7 and the meshing gears 17 is to allow the two wheelchair frames 10 to be brought together in order to fold the wheelchair whilst maintaining the drive unit 2 centrally between the two attachment clamps 4.

Figure 3:
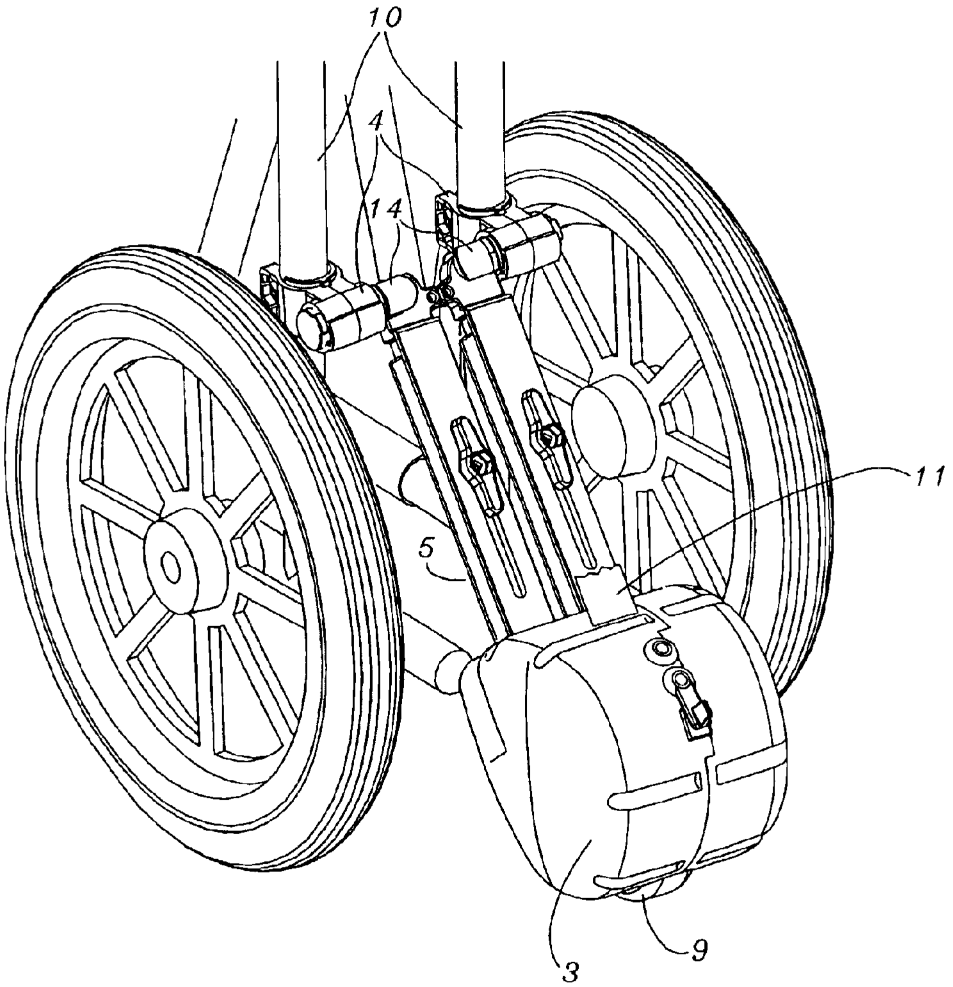
FIG. 3 shows a perspective detail view of the wheelchair drive unit fitted to a folded wheelchair to illustrate how the wheelchair drive unit folds with the wheelchair.

Referring to FIG. 3, a closeup view of the drive unit 2 is seen looking toward the rear side of the wheelchair 1 of FIG. 1, which is shown in FIG. 2 in folded condition. Most wheelchairs 1 are set to fold in a manner which brings the vertical frame members together in a parallel approach relationship. This is shown in FIG. 3 as the vertical frame members 10 are shown in close proximity to each other.

As can be seen, the bringing together of the vertical frame members 10 causes the removable pivots 14 to be brought together and the struts 5 brought to a generally parallel orientation. A lower portion of the lifting strap 11 is seen, with the remaining upper portion of the lifting strap removed for clarity and not shown in FIG. 3. The dimensionality shown has the vertical frame members 10 brought close but still far enough to accommodate the width of the struts 5 and the attachment clamps 4. Where a wheelchair 1 has a closer fold, differently dimensioned attachment clamps 4 may be provided to give a greater clearance. The electrical connections into the drive unit 2 are also shown as cut, truncated, or removed as both a switch connection and a power connection and will be discussed in further details. To illustrate quick removability, removable pivots 14 and a lifting strap 11, as well as the not yet mentioned on/off switch, battery pack and cables are not shown. FIG. 3 emphasizes the folded wheelchair 1 in which the struts 5 lie parallel to each other with the drive unit 2 maintained centrally between the attachment clamps 14.

Figure 4:
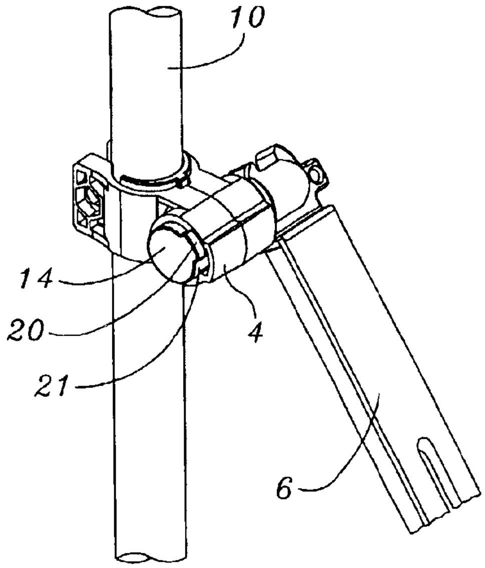
FIG. 4 shows a detail view of the clamp and pivot hinge for connecting the wheelchair drive unit to the wheelchair in the locked position.

Referring to FIG. 4, a closeup view of a portion of the vertical frame member 10 at the point of connection of the attachment clamp 4 is shown. The removable pivot 14 is shown from an end on view as having a tang 20 not aligned with a key or recess 21 in the clamp 4. The removable pivot 14 cannot therefore be withdrawn while the tang 20 is out of alignment with the key or recess 21. The tang 20 cannot be brought to a position of disengagement unless the drive unit 2 is swung extremely below the wheelchair 1, as by tilting what would have to be an empty wheelchair forward to enable the drive unit 2 to achieve a low angle. As a result, the drive unit 2 is in stable position so long as the wheelchair is occupied. Further, because of the positioning of the optional anti under run roller 53 shown later in FIGS. 21 and 22, if the wheel 9 begins to under run the wheelchair 1 as it pivots on pivots 14, the anti under run roller 53 comes into contact with the road surface and reduces the contact force between the wheel 9 and the ground leading to the wheel 9 slipping against the ground instead of gripping against the ground.

Figure 5:
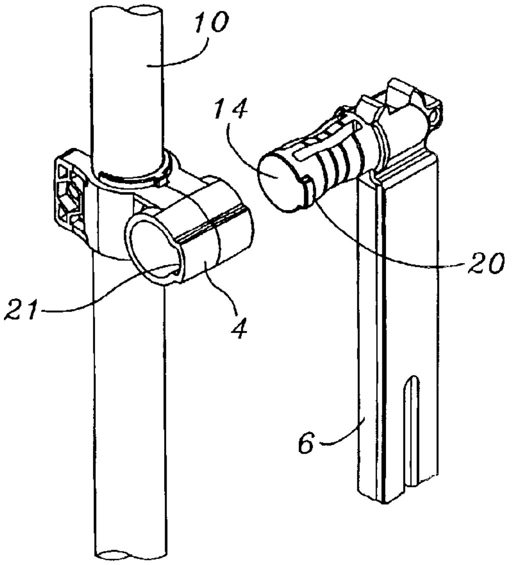
FIG. 5 shows a detail view of the clamp and pivot hinge seen in FIG. 4, but shown in the unlocked position.

Referring to FIG. 5, a closeup view of a portion of the vertical frame member 10 at the point of connection of the attachment clamp 4 is shown while the clamp half strut 6 is in a position nearly parallel with the vertical frame member 10. This has enabled the tang 20 to align with the keyhole recess 21 such that the removable pivot 14 is enabled to disengage the attachment clamp 4. As can be seen from the angle, and in respect of FIG. 1, the drive unit 2 would have to be brought so far below as to be in alignment, or nearly in alignment with the vertical frame members 10. Where attachment to frame members which are other than vertical are desired, clamps 4 which have a differently located key or recess 21.

Generally with regard to FIG. 5, the pivot 14 is emphasized from an end on view with its tang 20 aligned with the recess 21 in the attachment clamp 4. The two pivots 14 can therefore be withdrawn simultaneously in order to more quickly and easily remove the wheelchair drive unit 2 from the wheelchair 1.

Figure 6:
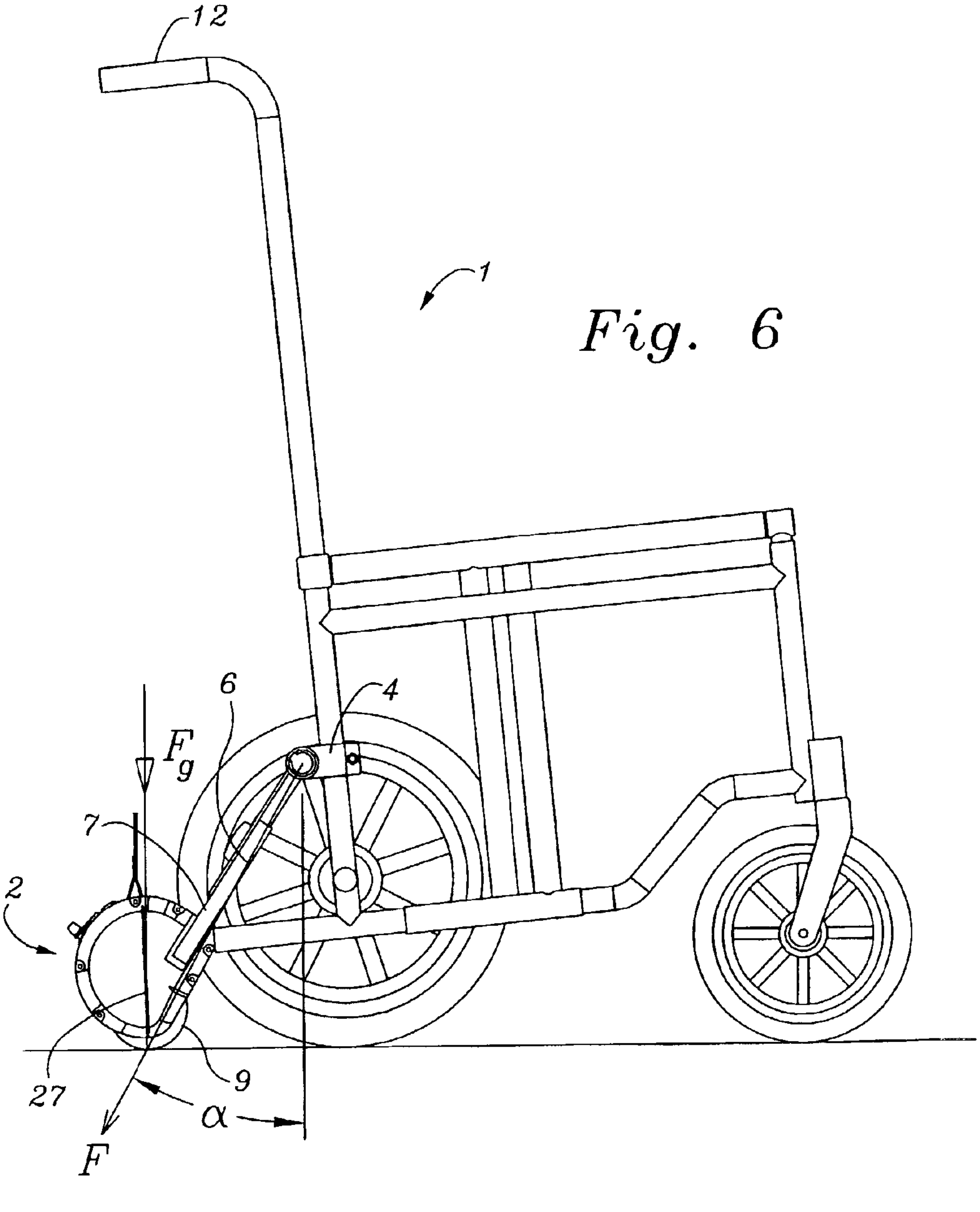
FIG. 6 shows a simplified side view of a wheelchair taken along line 6—6 of FIG. 1 and illustrating the angle formed by the pivot hinge, drive unit, its drive wheel and the ground surface.

Referring to FIG. 6, a profile side view of the wheelchair 1 is seen with the drive unit in place with its drive wheel 9 shown to the rear of the ground contact made with a large rear wheel 22. An angled line is drawn from the removable pivots 14 generally along side the struts 5 and to the point of contact of the drive wheel 9. An angle alpha is shown as taken between the angled line through the contact point of the drive wheel 9 on the ground and a vertical line taken from the center of the pivot 14 through to the ground.

It is clear that the attachment clamp 4 can attach to the vertical frame member 10 at various points along its vertical extent, such that a low attachment would result in a larger angle alpha and a higher attachment along vertical frame member 10 would result in a smaller angle alpha. This angle alpha is very important as the vertical force component Fg that pushes the drive wheel 9 down onto the ground is equal to F multiplied by cosine (alpha) where F is the force produced by the wheelchair drive unit 2 along the struts 5.

By having an angle alpha of about 35 degrees, the wheelchair drive unit 2 does not rely solely upon gravity to maintain sufficient grip to prevent slippage between the drive wheel 9 and the ground. The minimum angle alpha can be defined as the arctangent of the coefficient of friction between the rubber drive wheel tire 9 and the ground, any angle less than this will ensure that there is sufficient grip although an angle approaching zero would create a larger force Fg than is necessary. To ensure the angle alpha is optimized a mark 27 on the wheelchair drive unit indicates that the angle is correct when the mark 27 is visually positioned by the installer to assume a vertical condition. Again, the installer who is initially positioning the attachment clamps 4 up and down the vertical frame members 10 and adjusting the length of struts 5 can manually adjust the attachment clamps 4 as the mark 27 is observed to obtain the optimum position.

Figure 7:
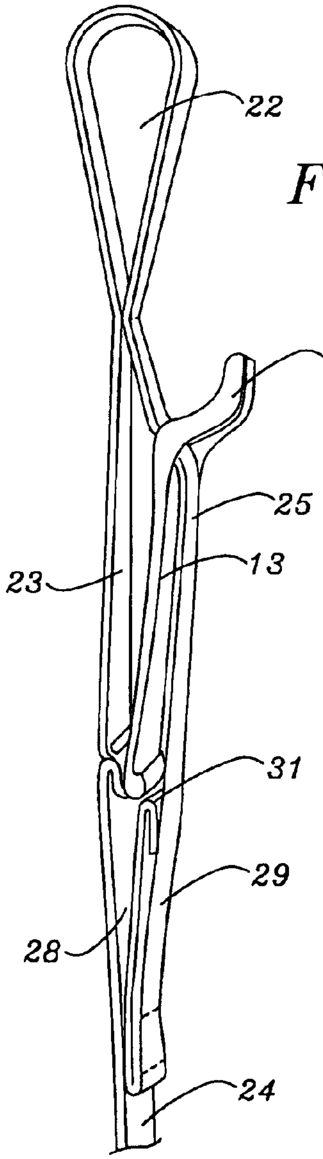
FIG. 7 shows a perspective view of a lifting strap with the lifter in its normal position.

Referring to FIG. 7 the top portion of the lifting strap 11 is shown with the lifter actuator 13 seen as a rigid member connected to one side of two generally vertical portions of the lifting strap 11, and is shown in the normal stable first position in which the drive wheel 9 is seen resting on the ground. A loop 22 is used to attach the lifting straps to another structure such as the wheelchair handle 12 which was shown in FIG. 1.

Four components of the lifting strap 11 include upper components 23 and 25 as well as lower components 28 and 29. Components 23 and 28 are generally delineated by the point 26 at which the end of the lifter actuator 13 is attached. Components 25 and 29 are generally delineated by the presence of a stop 31 which is a doubling over of the strap material as shown in FIG. 7, or some other blocking structure which will prevent further downward movement of the upper curved end 33 of the lifter actuator 13.

Figure 8:
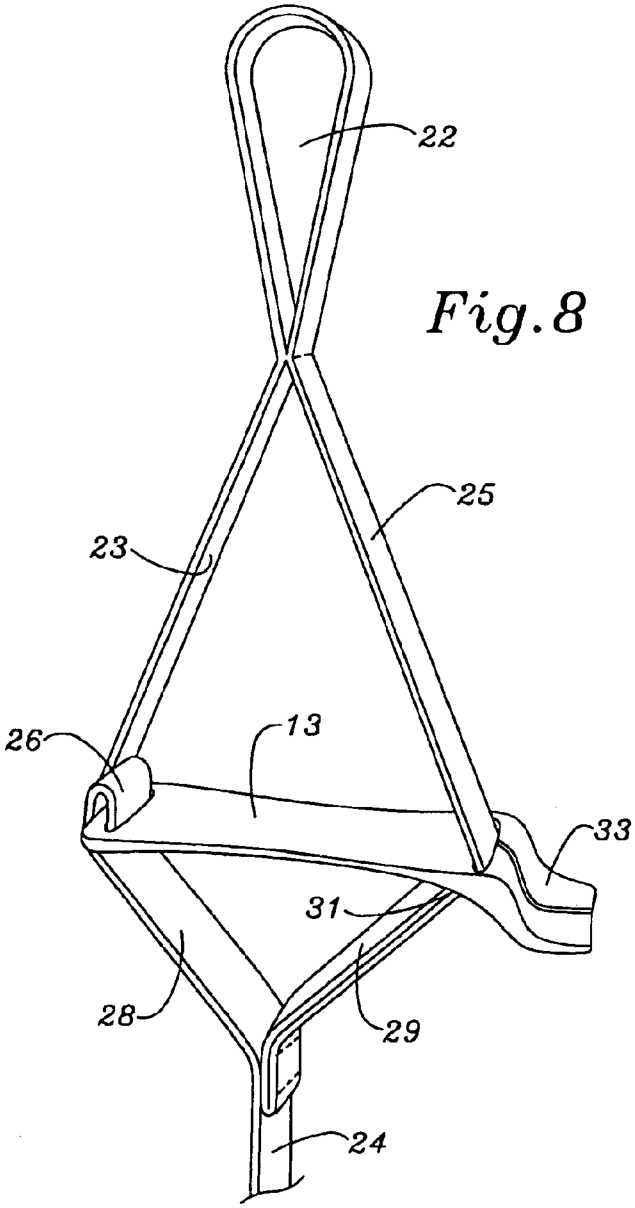
FIG. 8 shows the lifting strap with the lifter positioned in the drive wheel raised position.

The use of the lifter actuator 13 enables a relatively weak person to apply a lifting force to the lifting strap 11 by applying a much lesser downward force to the lifter actuator 13. Referring to FIG. 8 the application of this downward force is illustrated. The top of the lifter strap 11 is shown with the lifter actuator 13 in the horizontal second stable position to place the lifter strap 11 in an overall raised position to lift the drive unit 2 upwardly. Upward movement of the drive unit 2 while the wheelchair is on a flat ground surface will disengage the drive unit 2 from the ground. This, in turn, raises the drive wheel 9 off the ground.

In FIG. 8, the lifting actuator 13 is shown in a position after the curved end 33 has been pushed until it rests against the stop 31 while the connected end of the lifter actuator 13 pivots about its connection to the junction of portions 23 and 28, about a loop 26. The four components 23, 25, 28 and 29 now form a diamond shape, the net effect of which is to shorten the overall length of the lifting strap 11.

In the installation the wheelchair drive unit 2 is fitted to the wheelchair 1 using the clamps 4. The struts 5 are then adjusted until the drive unit 2 is centrally located between the clamps 4 and the indicator mark 27 is generally as vertical as possible while the wheelchair is on flat ground. Adjustment of the struts 5 with horizontal wheelchair members may be accomplished with the clamps 4 or with other types of clamps, and where other members are used, care should be taken to insure that proper mounting can be effectuated. With the lifting actuator 13 in the normal, non-lifted position shown in FIG. 7, the loop 22 is affixed to the handle 12 and the lifting strap 11 is then adjusted until there is no significant slack in it.

Once the above adjustment has been made, to raise the drive wheel 9 and drive unit 2 off the ground the lifting actuator 13 is moved to the horizontal, raised position as is shown in FIG. 8. To drop the drive wheel 9 and wheelchair drive unit 2 back onto the ground the lifting actuator 13 is moved back to the normal position seen in FIG. 7. The lifter actuator 13 can be manufactured in a variety of lengths and widths to affect lifting over a variety of height differentials and with a variety of different widths and thicknesses of lifting strap 11.

While operating the wheelchair under powered movement and in forward motion, to clear a curb stone or other obstruction the drive wheel 9 and wheelchair drive unit 2 can be raised instantly and substantially by pulling up the lower strap 24 directly by hand, if necessary. Raising the drive unit 2 by hand will minimize the shock and impact to the drive unit 2. However, for small step downs or step ups, the forward momentum of the wheelchair 1 and the flexibility of the drive unit 2 should minimize any disruption.

To quickly remove the wheelchair drive unit 2 from the wheelchair 1 the lifting strap 11 is disconnected by loosening the lifting strap 11 and removing loop 22 from the wheelchair handle 12. The wheelchair drive unit 2 can then be dropped down until angle alpha is approximately zero typically by up tilting the wheelchair as by raising it or tilting it forward to provide clearance to achieve such a zero angle. Once the zero angle is achieved, the tangs 20 on removable pivots 14 then align with recesses 21 and the removable pivots 14 can then be easily withdrawn from the attachment clamps 4. The wheelchair drive unit 2 can then be withdrawn from the wheelchair 1 typically after disconnecting a located on/off switch and battery to be shown below.

Figure 9:
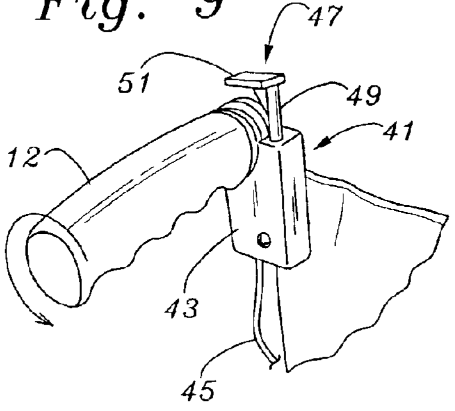
FIG. 9 shows a rear perspective of a switch with pivotable lockout for fitting adjacent a wheelchair handle.

Referring to FIG. 9, a closeup of handle 12 illustrates a plunger switch assembly 41 which includes a base housing 43 connected by an electrical cord 45. Base housing 43 has a plunger 47 which includes a vertical member 49 and an angled thumb support 51. To activate the switch assembly 41 to an "on" position the thumb support 51 is depressed gently driving the vertical member 49 into the base housing 43.

The position of the thumb support 51 is generally overlying the handle 12. In its full downward travel, the thumb support 51 has a lower surface which rests on either the handle 12 or a portion of the base housing 43 which overlies the handle 12. In this configuration there is good support underneath the thumb support 51 to guard against any damage from undue or inadvertent thumb pressure. As can be seen by the arrow, the plunger 47 is rotatable to bring the thumb support 51 from its position over the handle 12 and generally to a position parallel with the handle 12, either forward or rearwardly in direction. In this position the plunger 47 is locked out of an ability to close the switch to activate the wheelchair drive unit 2. This feature will prevent accidental triggering of the plunger 47 and inadvertent turning on of the wheelchair drive unit 2.

Figure 10:
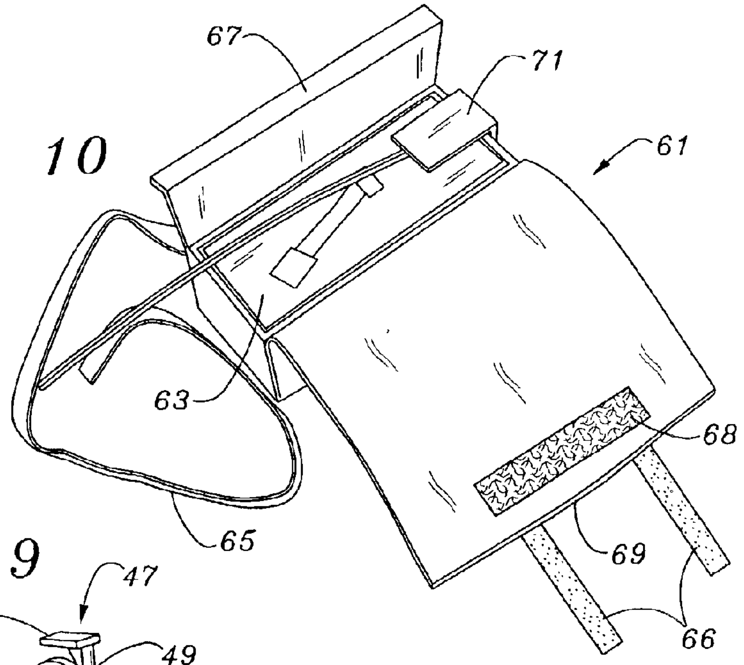
FIG. 10 is a perspective view of a flexible battery support with an attachment strap.

Referring to FIG. 10, a view of an open cloth bag 61 surrounds a battery 63. The cloth bag 61 has a long strap 65 two or more short straps 66 and a pair of flaps 67 and 69 fitted with areas of hook and loop members 68 to ensure that the battery 63 is secured. A connector 71 is provided to fit closely onto the battery 63 and has an overbite portion to fit onto the battery terminals and to form a locking relationship with the battery 63 and battery cable 62. The close fit of the connector enables the flaps 67 and 69 to be brought tightly over the top of the battery 63 to both securing the battery 63 within the cloth bag 61 and thus further securing the connector 71 and the short length of the battery cable 62 onto the battery 63.

Figure 11:
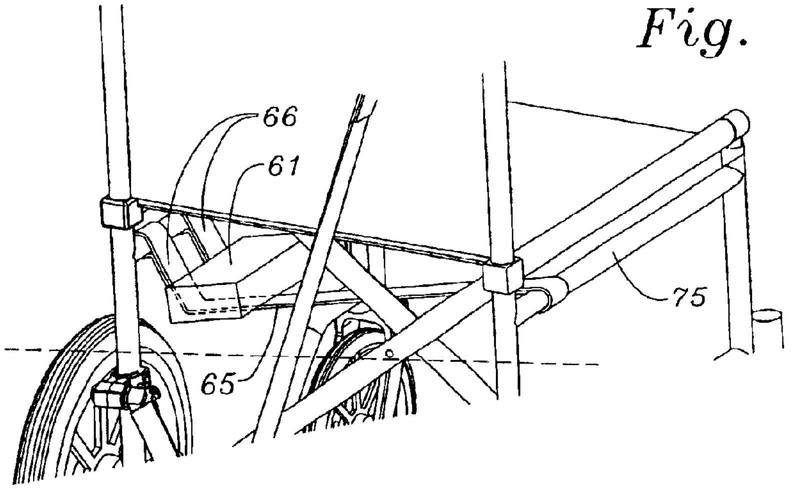
FIG. 11 is a rear perspective view of a wheelchair and illustrating the use of the soft battery case and suspension support.

Referring to FIG. 11, a rear view of the wheelchair 1 shows the cloth bag 61 containing the battery 63 in place beneath the seat area of wheelchair 1. The short straps 66 are used to suspend the battery 63 and cloth bag 61 from any convenient horizontal support 75 on wheelchair 1. The long strap 65 can then be used to pull the battery 63 and cloth bag 61 away from any tire 70 that may impinge on it by looping over any further convenient horizontal support 75 on wheelchair 1 and pulling it taught enough to take up the slack. The cloth bag 61 and straps 65, 66 extend generally between horizontal supports 75 on the wheelchair 1. However, the straps 66 provide a configuration such that the battery 63 and cloth bag 61 can be attached or suspended from the wheelchair 1 in any manner which will give it secure support.

Figure 12:
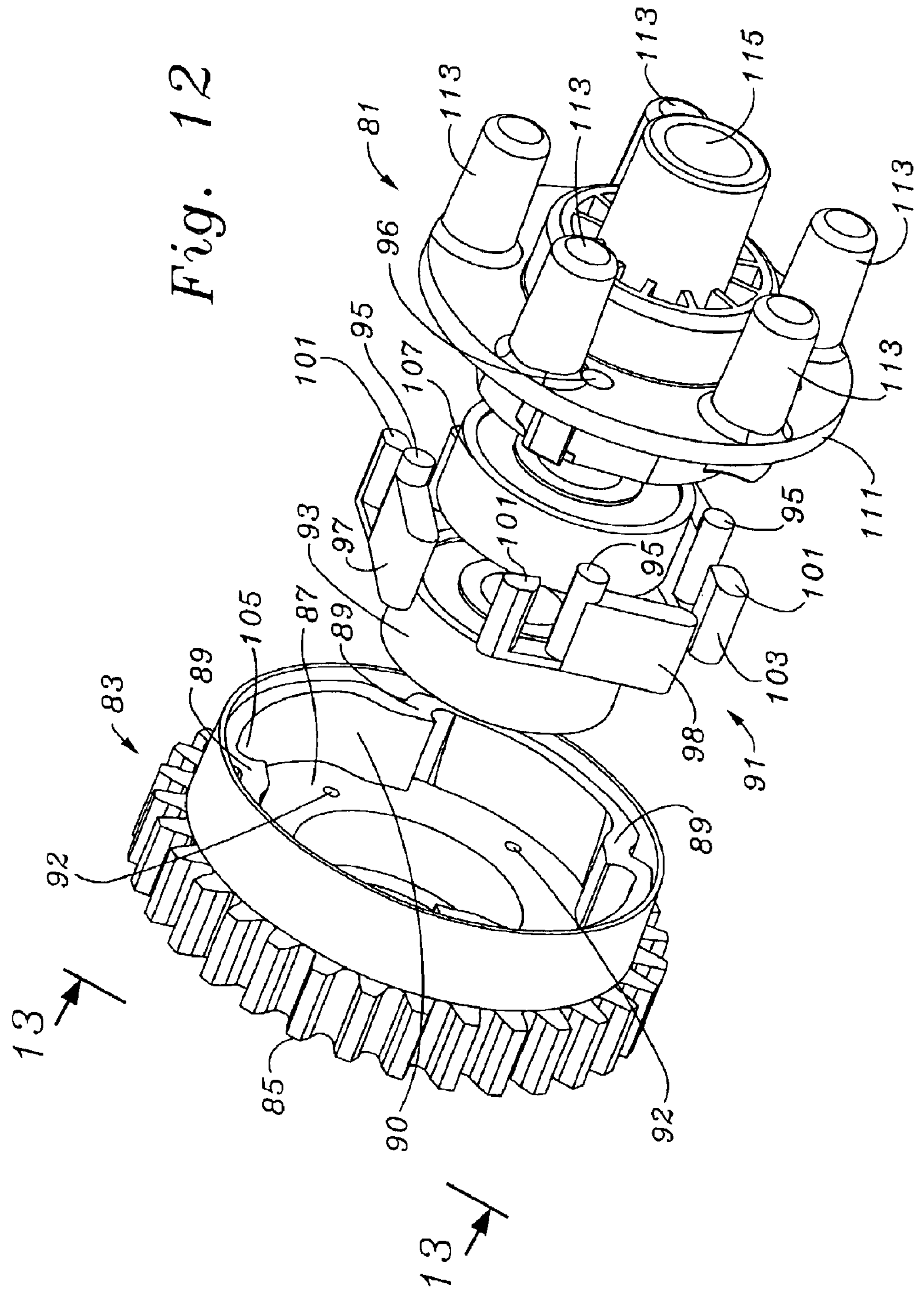
FIG. 12 is an exploded perspective view of the clutch which uses pivoting engagement members to enable the drive wheel to be moved forward powered by the motor as well as moved forward passively when the motor is not operating.

Referring to FIG. 12, an exploded view of a drive assembly 81 includes an ultimate drive gear 83 having drive teeth 85 and a space 87. Within the space 87 are a series of raised circumferentially inwardly directed engagement structures 89. Each of the engagement structures 89 has a circumferentially inwardly predominant axial cam surface 90 with respect to the overall axis of depth of the space 87. The axial depth enables a wider profile on the engagement structure 89 for engagement by an associated one of a series of pawls 91. The pawls 91 are individually pivotally attached via pivot pin 95 pivoting in pawl hole 96 in clutch plate 111. Each pawl 91 has a cam follower half 101 and a load bearing half 97 that includes a cam following face 98. The pawls 91 are individually pivotally attached via pivot pin 95 pivoting in pawl hole 96 in clutch plate 111. Each pawl 91 has a cam follower half 101 and a load bearing half 97 that includes a cam following face 98. Each of the pawls 91 may preferably be made from a polymer material and have a distant curved end 103 which interfits with a curved space 105 in one side of the engagement structure 89. The cam follower half 101 of pawl 91 and the cam following face 98 of the load bearing half 97 of the pawl 91 both contact the cam face 90 of the engagement structure 89 with causes the pawl 91 to be moved between two positions. Bearing 93 fits into ultimate drive gear 83 to locate it onto a common axle not shown. Bearing 107 fits into clutch plate 111 to locate it onto a common axle not shown.

The cam face 90 is ramped so that force engagement cannot be had from rotation in the other direction. This enables, as will be shown, the wheelchair drive unit 2 to "over run" or put another way, enables the drive wheel 9 to turn in the forward direction when the motor 15 is off. This is useful when the wheelchair is being pushed forward. Otherwise, the lifter actuator 13 would have to be lifted each time that non-driven forward movement was desired. Otherwise, a positive connection with the drive wheel 9 would cause it to drag if the wheelchair 1 is pushed forward when the motor 15 isn't running. If the ground surface is rough, a dragging drive wheel 9 could cause flat spots and loss of continuous drive ability.

The clutch plate 111 supports wheel drive transfer pegs 113 which fit through matching apertures of the drive wheel 9 (not shown in FIG. 12). A central hub 115 is a support about which the drive wheel 9 fits.

Figure 13:
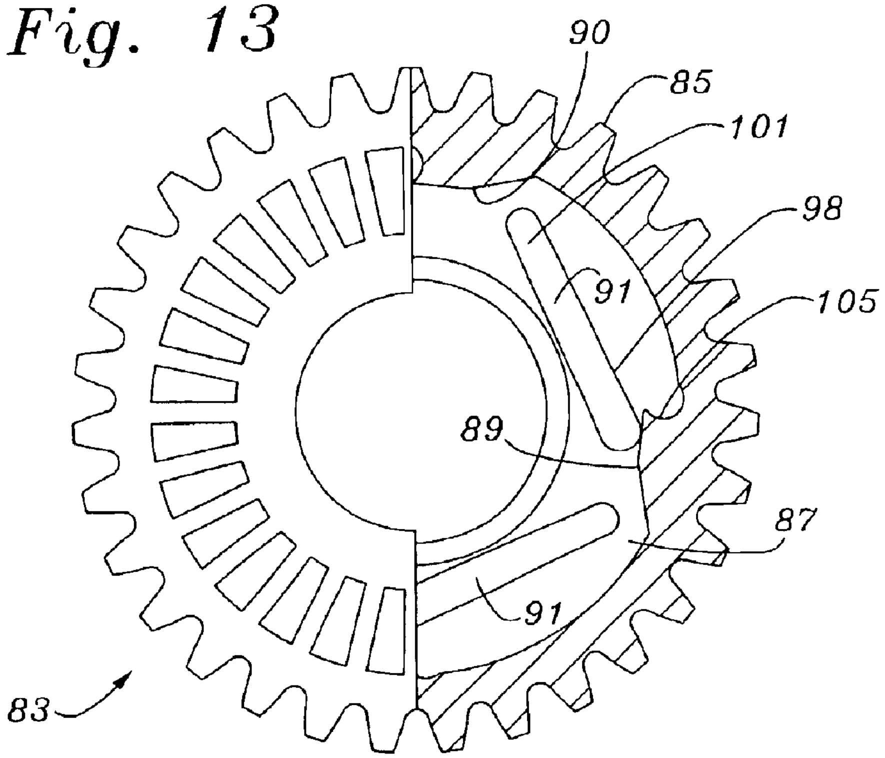
FIG. 13 is a side schematic view showing the pivoting pawls in an unengaged position.

Referring to FIG. 13, a semi-sectional view taken from the vantage point of line 13—13 of FIG. 12 illustrates a schematic orientational view of the pawls 91 prior to engagement into its respective curved space 105. It can be seen that if the pawls 91 move counterclockwise with respect to drive gear 83 and taken in respect of the views of FIGS. 13 and 14, the pawls 91 will circle the space 87 traveling in a counterclockwise direction and bump against, and pass over the engagement structures 89. This will cause the cam follower half 101 will come into contact with the cam face 90 which will move the pawl 91 to a position in which cam follower face 98 will contact the cam face 90 if the drive wheel 9 continues to rotate causing the pawl to move back to its original position relative to clutch plate 111 not shown.

Figure 14:
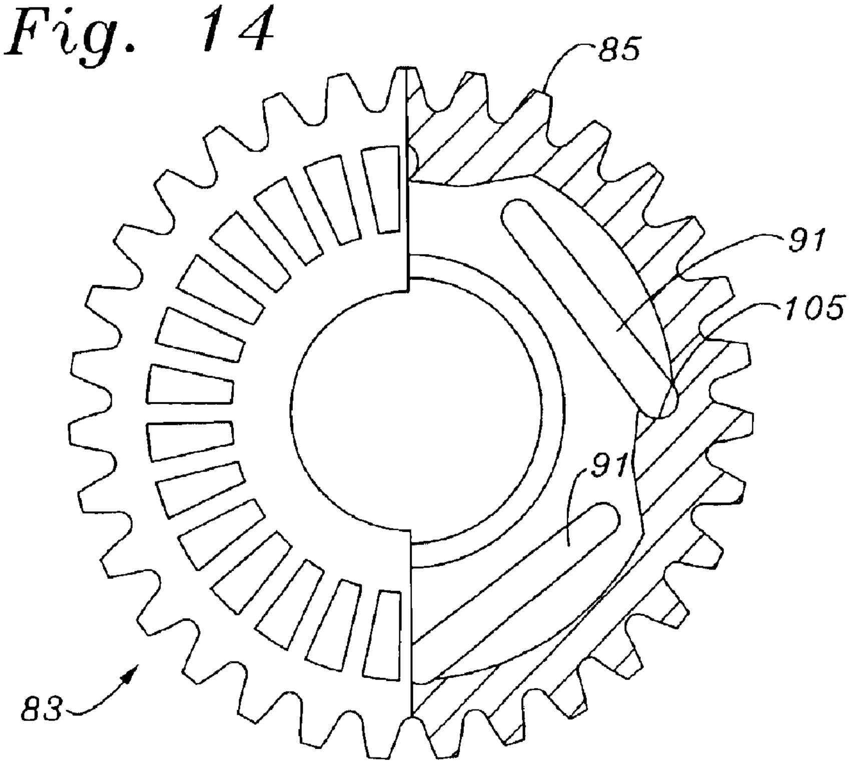
FIG. 14 is a side schematic view showing the pivoting pawls in an engaged position.

However, should the direction of travel of the pawls 91 be reversed, the distant curved ends 103 of the pawls 91 will slide along the cylindrical inner wall of the space 87 and into engagement with their next closest respective curved space 105. This is shown in FIG. 14. FIG. 14 illustrates the position of the pawls 91 during mechanical driving. If the distant ends 103 of pawls 91 were not in the correct position to engage with the next respective curved space 105, the action of the cam follower half 101 and cam following face 98 against the cam face 90 will move the pawl 91 into a suitable position as the pawl 91 rotates due to the driving motion of motor 15 via speed reducing mechanism 16.

Figure 15:
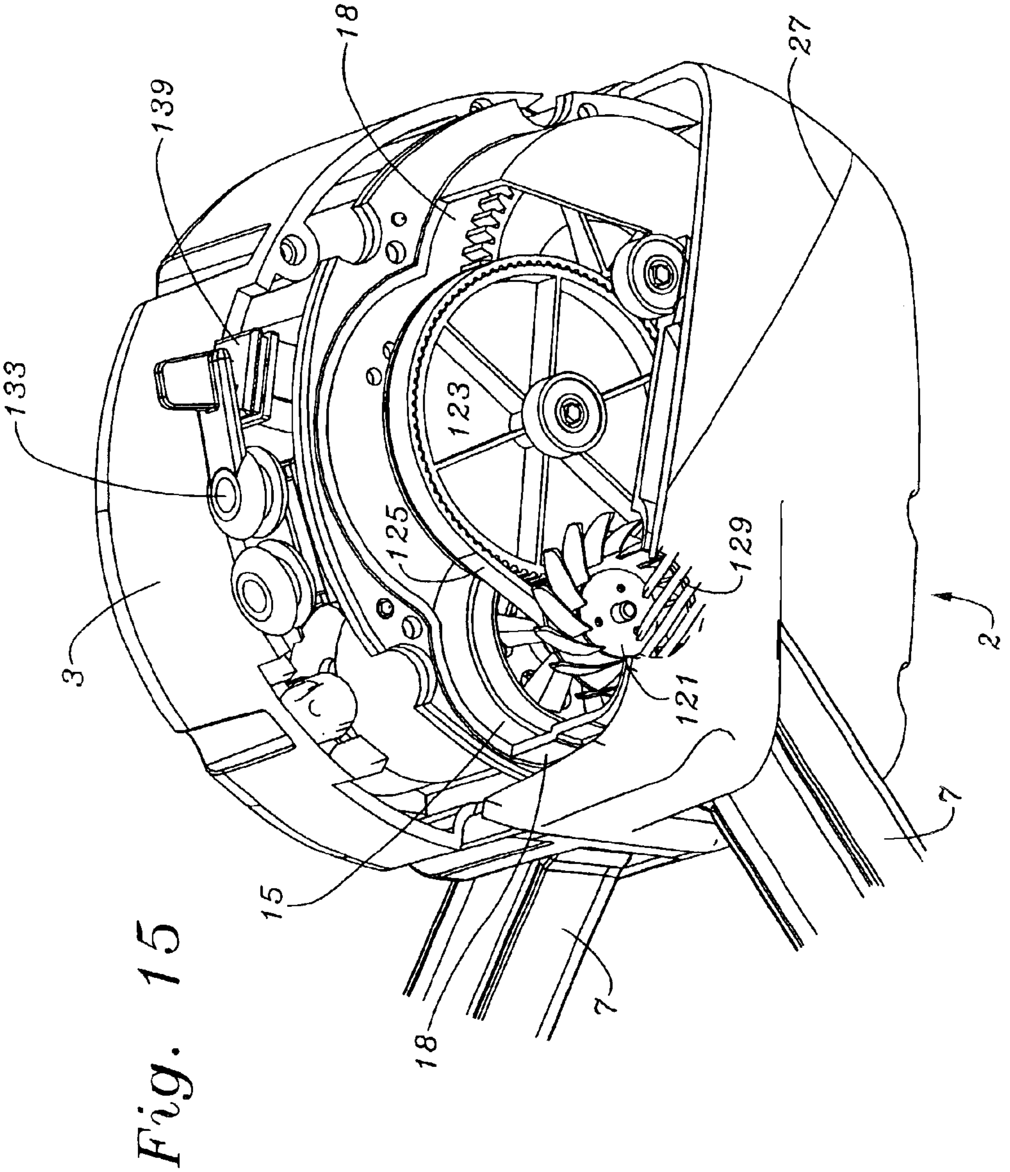
FIG. 15 is an exposed upper perspective view of the gear box of the drive unit and illustrating the use of a radial fan for pressurizing the internals of the gear box.

Referring to FIG. 15 a view of an upper quarter quadrant of the outer drive housing 3 shown removed to illustrate structure utilized in producing a pressurized gearbox effect. A radial fan 121 is seen along an upper extent of the inner drive housing 18. Radial fan 121 has with curved, pressure inducing blades. The radial fan 121 is mounted directly on the motor 15 along with the Pinion. The motor 15 is also shown connected to a drive sprocket 123 by a belt 125. Thus, when the wheelchair drive unit 2 is powered and moving forward, the radial fan 121 will operate. The action of the fan is to pressurize the gearbox portion of the inner drive housing 18 to about 2 millibar of pressure. This pressurization action reduces the amount of dirt that can enter the gearbox and is achieved by having the radial fan 121 draw air into the gearbox space through a vent 129 consisting of a series of slots in the outer housing 3 and a hole in the inner drive housing 18. The exit point for the air is the space immediately between the drive wheel 8 and the inner drive housing 18 and through bleed holes 92 in the ultimate drive gear 83 (seen in FIG. 12), thereby blowing out dirt that may otherwise find work itself into the inner drive housing 18 and drive assembly 81. Holes (not shown) in the inner drive housing 18 also allow air to stream over the hot motor 15 and hot electronic components not shown.

In the closeup drawing of FIG. 15, also seen are a few other features, including a charging jack 139 (shown partially covered) which enables easy access for the recharging of the attached battery 63 seen in FIG. 10.

Figure 16:
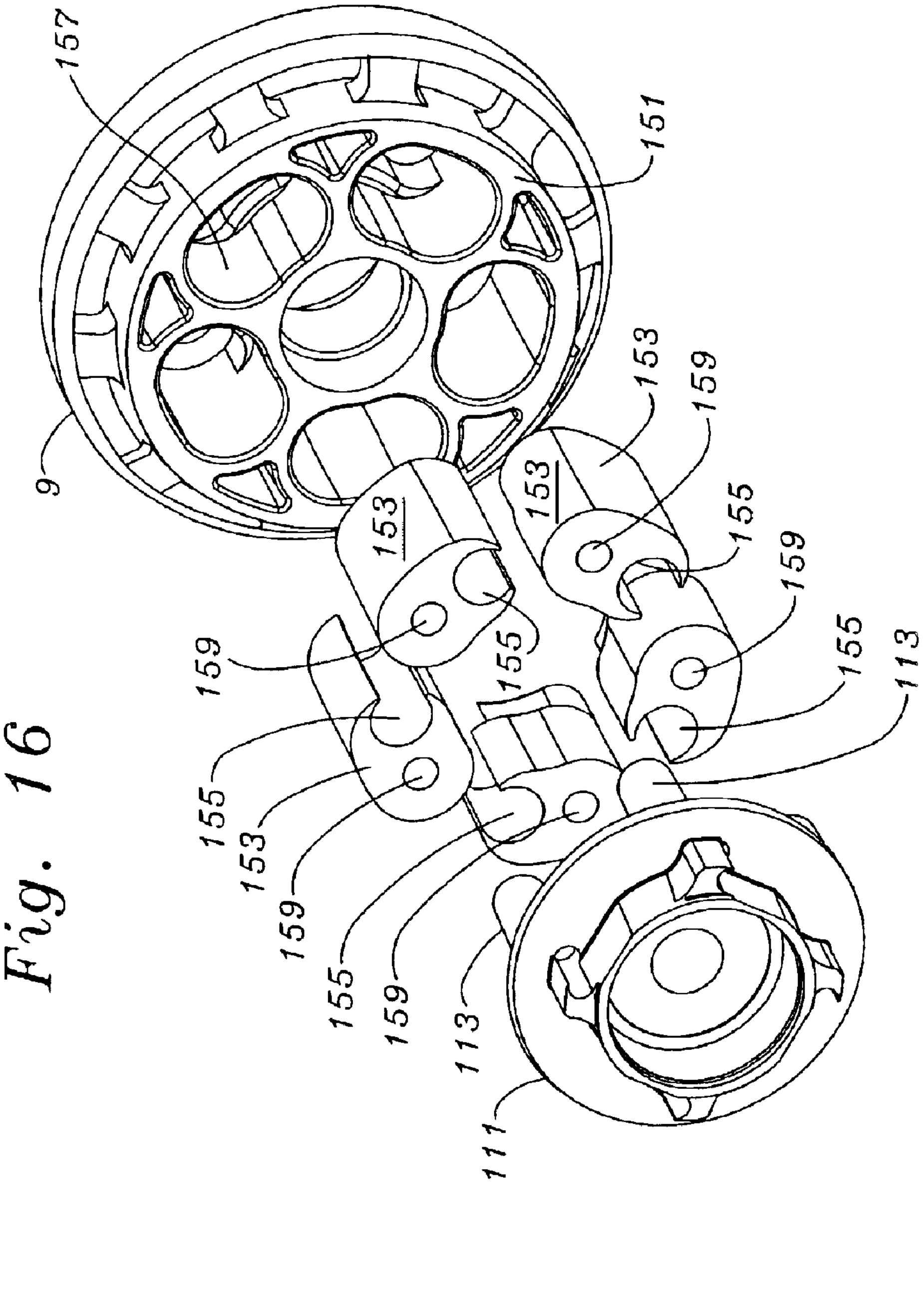
FIG. 16 is an exploded view of the components of a radial shock reduction system to cushion initial starts of the motor against the drive wheel.

Referring to FIG. 16, a perspective view of the hub 161 of drive wheel 9 and illustrating the use of a shock absorbing hub 151 with polymeric or rubber inserts 153 in order to limit the transmission of starting and stopping type rotational shocks from the drive wheel 9, via the hub 151, is shown. Each of the rubber inserts 153 includes a large opening 155 superimposed at one side of an oval cross sectional shape.

The rubber inserts 153 are also shown as having a smaller bore 159 which will help control the deformation of the rubber insert 153 in the direction which it will be compressed between the wheel drive transfer pegs 113 and the forward side of the associated oval opening 157 of hub 151. As can be seen, there are five rubber inserts 153 matching five oval openings 157 in hub 151. The direction of force turning is counterclockwise from the perspective of FIG. 16. Initial turning tends to compress slightly the five rubber inserts 153 to create a much gentler beginning motion. Once the rubber inserts 153 are initially compressed under the instant starting force, and once forward motion starts, the rubber inserts 153 will decompress slightly as forward motion starts.

Figure 17:
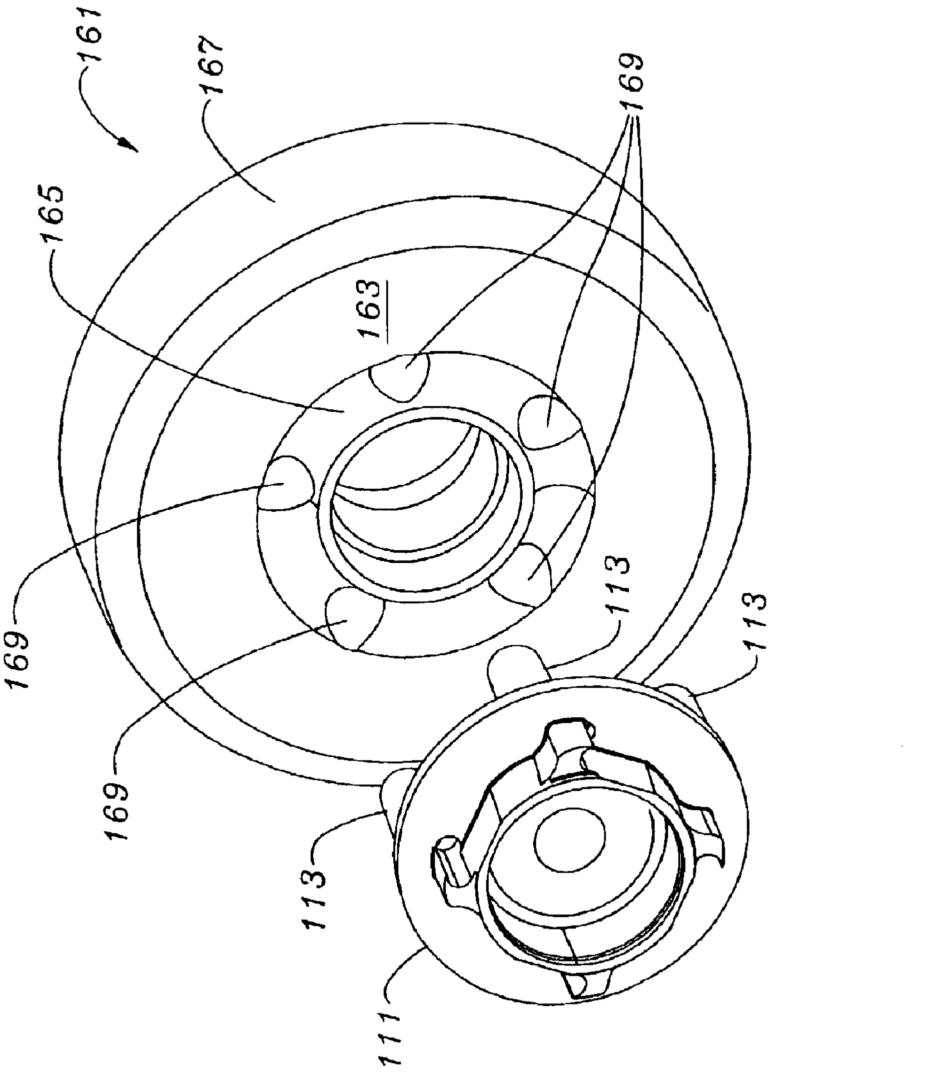
FIG. 17 is a second embodiment a modified version of the radial shock reduction system to cushion initial starts of the motor against the drive wheel which depends upon the construction of the drive wheel.

Referring to FIG. 17, a second possible embodiment includes a drive wheel 9 material made of a shock absorbing material which removes the need for individual rubber inserts 153. A drive wheel 161 is made of softer material, especially an intermediate layer 163 which connects a hub 165 and an outer layer 167. In this case, the hub 165 includes circular drive transfer bores 169 for directly accepting the drive transfer pegs 113.

Figure 17B:
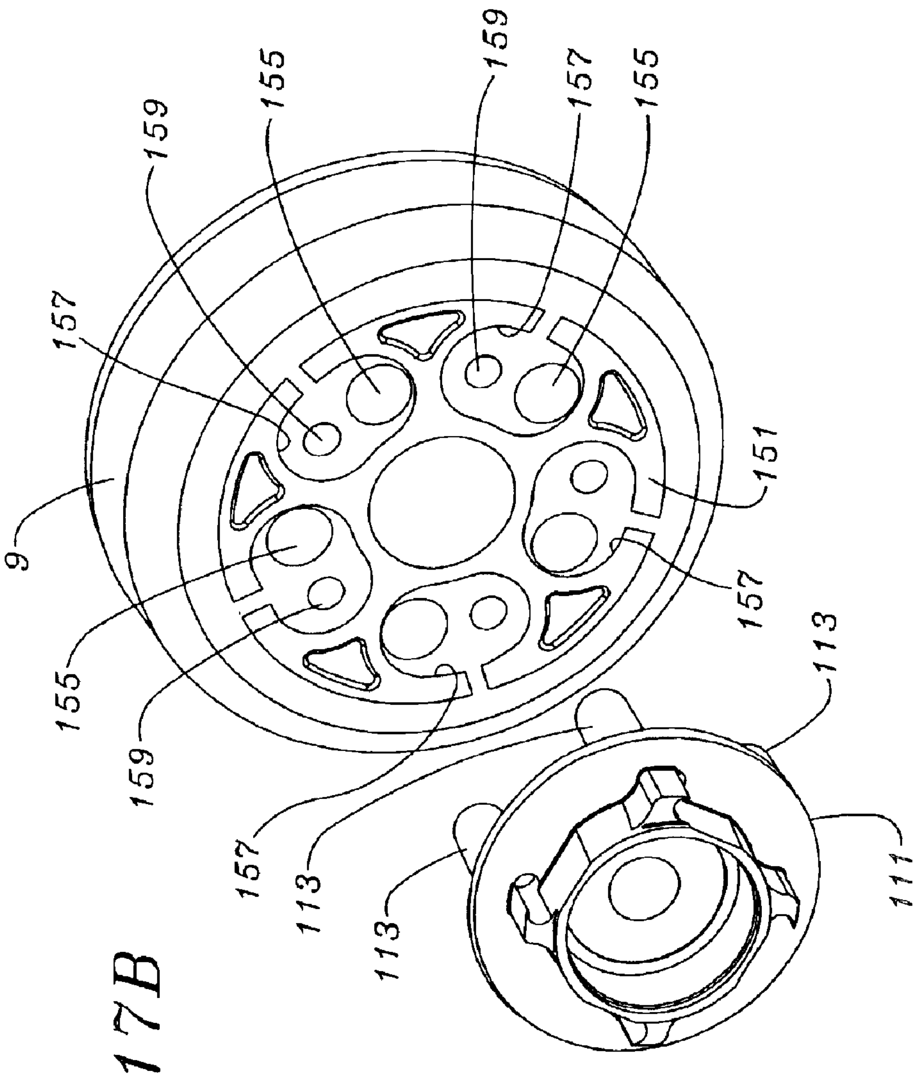
FIG. 17B is a third embodiment of a shock reduction system to cushion initial starts of the motor against the drive wheel and which depends upon the construction of the drive wheel.

Referring to FIG. 17B, a third possible embodiment includes a drive wheel 9 incorporating a hub 151 that has oval openings 157 within it. The rubber material of the drive wheel 9 extends to fill the oval openings 157 thereby eliminating the need for separate inserts. A smaller bore 159 will help control the deformation of the rubber in oval opening 157 of hub 151 in the direction which it will be compressed between the wheel drive transfer pegs 113 and the forward side of the associated oval opening 157 of hub 151.

Figure 18:
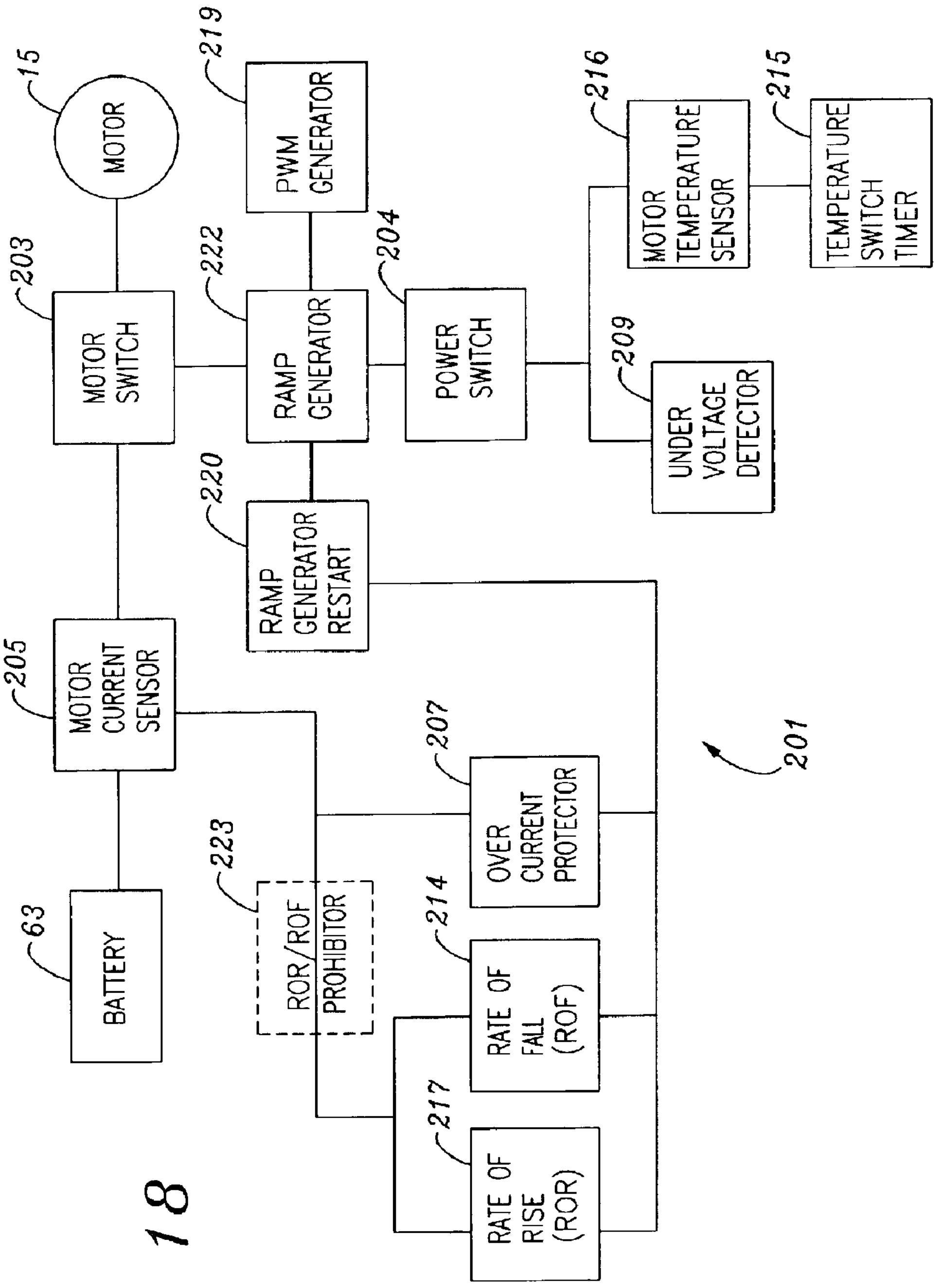
FIG. 18 is a view of the electrical and control schematic illustrating the rate of rise and rate of fall circuit employed in conjunction with the drive system.
Figure 19:
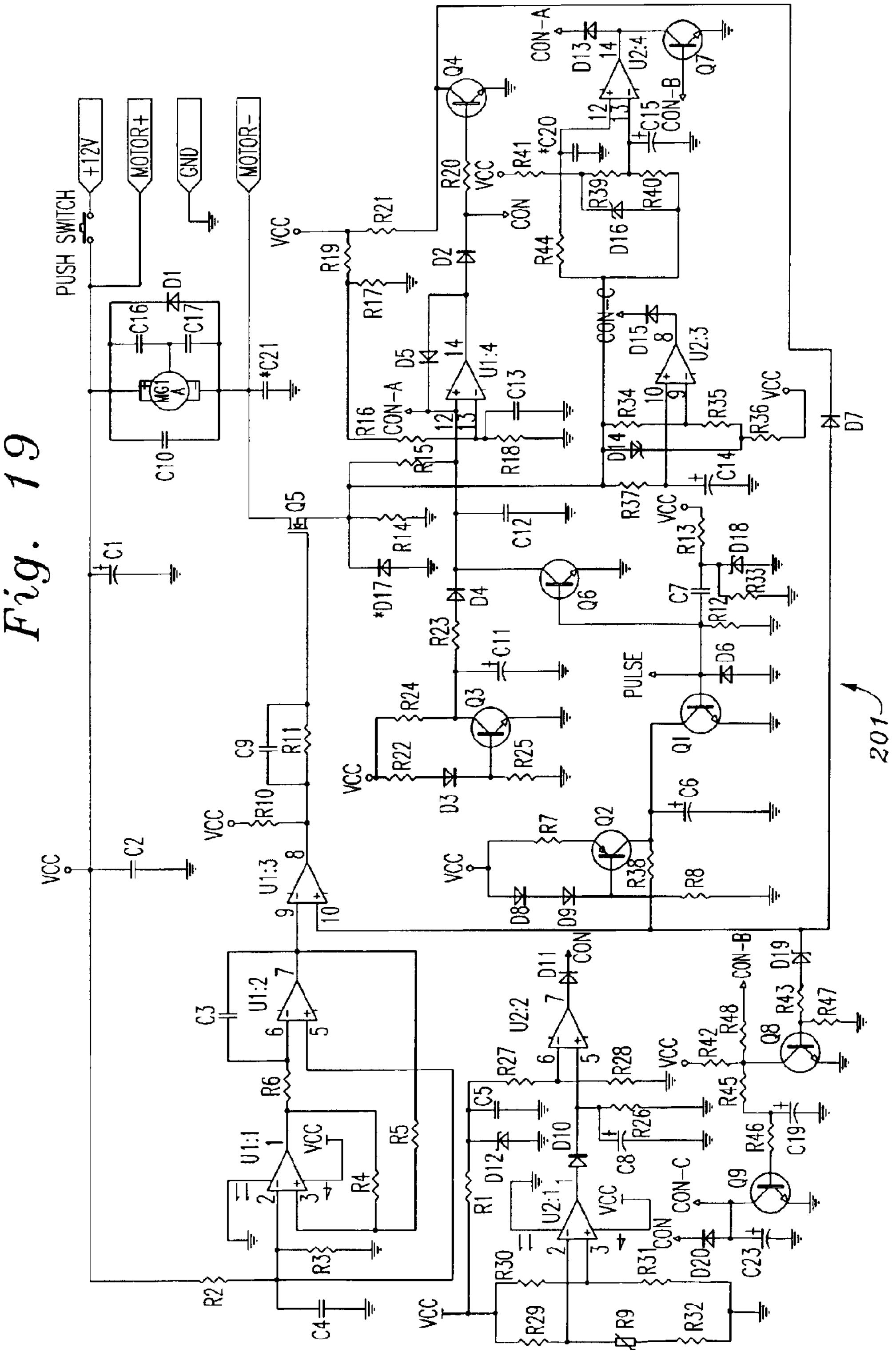
FIG. 19 illustrates an analog realization of the block diagram of FIG. 18 as a circuit which automatically provides protective features for the motor.

Referring to FIG. 18, an overall schematic illustrating a an over current, over temperature, under voltage, soft start and rate of rise/rate of fall circuit shown within an overall schematic 201. Where items are named which were seen in earlier figures, the original numbering will be used. The overall block schematic of FIG. 18, as well as the circuitry diagram of FIG. 19 give a control system which can both detect and react to a set reaction conditions, individually or collectively, and which include one or more of an over current condition, a rate of fall condition, a rate of rise condition, a high temperature condition and an under voltage condition BATTERY 63 is connected to motor 15 via MOTOR CURRENT SENSOR block 205 and controlled via Motor Switch block 203. When a power switch 204 (seen physically as the plunger switch assembly 41) is switched on, an UNDER VOLTAGE DETECTOR block 209 begins to monitor the voltage of Battery 63 and switches the motor 15 off if battery voltage drops below a predetermined level, or if a MOTOR TEMPERATURE SENSOR block 216 begins to monitor the temperature of motor 15 and shuts the motor 15 down for a minimum predetermined time via a TEMPERATURE SWITCH TIMER block 215 if the temperature rises above a predetermined limit and the combined action of a RAMP GENERATOR block 221 and a pulse width modulator PWM GENERATOR block 219 begin to progressively switch on MOTOR SWITCH block 203 which causes MOTOR CURRENT SENSOR block 205 to send a signal to an OVER CURRENT PROTECTOR block 207 which momentarily switches off the motor via RAMP GENERATOR RESTART block 220 if the current rises above a predetermined limit, RATE OF RISE (ROR) block 217 which monitors the current utilized and if the current utilized rises above a predetermined rate (amps per second) the circuit momentarily shuts down the motor 15 via RAMP GENERATOR RESTART block 220 and Rate of Fall (ROF) block 214 which monitors the current utilized and if the current utilized drops above a predetermined rate (amps per second) shuts off power momentarily via RAMP GENERATOR RESTART block 220.

An OPTIONAL ROR/ROF PROHIBITOR block 222 delays the output signal from the MOTOR CURRENT SENSOR block 205 to the ROR block 217 and ROF block 214 until the RAMP GENERATOR block 221 has completed its ramp generation and the MOTOR SWITCH block 203 is fully on.

The circuit 201 has several parts, including the rate of rise (ROR) and rate of fall (ROF) components. The ROR portion monitors the current utilized and if the current utilized rises above a predetermined rate (amps per second) the circuit shuts down the motor 15. The physical condition which would cause an ROR trip condition is one in which the wheelchair suddenly slows quickly under positive force conditions, for example, as the wheelchair 1 bumps into a curb or wall. This results in a rapid slowing of the motor leading to a surge in current and torque. The ROR circuit reacts more quickly than a simple over current circuit. A simple over current circuit would allow current to rise all the way up to a preset limit before cutting power, however the ROR circuitry of the present invention will cut power as soon as the current begins to rise rapidly towards the preset limit.

The ROF circuit also monitors the current and shuts off power if the current drops above a predetermined rate (amps per second). The condition which would cause a ROF trip is one in which the wheelchair drive unit suddenly and unexpectedly speeds up. This would occur if the drive wheel was turning slower than its top speed and then suddenly sped up, for example if it slipped on loose gravel, ice, oil or simply bounced up and lost traction with the pavement. The motor would normally suddenly speed up to its no load speed with a corresponding reduction in current.

Referring to FIG. 19, an analog realization of the circuit 201 provides an operating system for both operation and protection of the motor 15. At the upper right of FIG. 19 is a flag entitled +12V which represents the positive 12 volt connection to the battery. The flag entitled MOTOR+ indicates the positive lead for the motor 15. The flag GND is the generalized ground flag. The plunger switch assembly 41 is shown as connecting the positive 12 volt connection to the battery to the positive lead for the motor 15.

The motor 15 power input terminals are paralleled by a capacitor C10. A series combination of capacitors C16 and C17 are connected in parallel to capacitor C10. The center connection of capacitors C16 and C17 are connected into the motor 15 at a center of the stator windings. The motor positive lead is also connected to ground through a parallel combination of capacitor C2 and capacitor C1.

The motor positive lead is connected into the negative input of an operational amplifier U1:1 through a resistor R2. The negative input of an operational amplifier U1:1 is connected to ground through a parallel combination of resistors R3 and capacitor C4. A positive input of an operational amplifier U1:1 is connected to its output through a resistor R4. The operational amplifier U1:1 rails include the 12 volt supply voltage and ground.

The output of input operational amplifier U1:1 is connected to a negative input of an operational amplifier U1:2 through a resistor R6. A capacitor C3 connects the negative input operational amplifier U1:2 to its output. The output of operational amplifier U1:2 is connected back through the positive input of operational amplifier U1:1 through a resistor R5.

At the lower left side of FIG. 19, a circuit begins with a connection labeled VCC which represents the 12 volt supply power, written at the left side to simplify the schematic. The voltage potential is connected to ground through a first series combination of a resistor R29, thermistor R9 and resistor R32. The voltage potential is connected to ground through a second series combination of a resistor R30, and resistor R31.

A connection between the thermistor R9 and R29 is supplied to the negative input of an operational amplified U2:1. A connection between resistors R30 and R31 is supplied to the positive input of an operational amplified U2:1. The output of operational amplified U2:1 is supplied to the positive input of an operational amplifier U2:2 through a diode D10. The positive input of operational amplified U2:2 is also connected to ground through a parallel combination of capacitor C8 and a resistor R26.

The supply voltage VCC is connected to the negative input of operational amplified U2:2 through a series combination of resistor R1 and resistor R27. The connection between resistors resistor R1 and resistor R27 is also connected to ground through a parallel combination of zener diode D12 and a capacitor C3. The negative input of operational amplifier U2:2 is also connected to ground through a capacitor R28. The output of operational amplifier U2:2 is connected through diode D11 to an output labeled CON.

At the lower left side of the FIG. 19, the connection CON is also connected through a series connected diode D20 and capacitor C23 to ground. The connection between the diode D20 and capacitor C23 is connected to a connection CON-C and to the collector of a transistor Q9, the emitter being grounded. The base of transistor Q9 is connected to ground through a series connected resistor R46 and a capacitor C19. The connection between the resistor R46 and a capacitor C19 is connected to the collector of a transistor Q8 through a resistor R45. The collector of transistor Q8 is connected to the voltage source VCC through a resistor R42 and to a connection CON-B through a resistor R48. The emitter of transistor Q8 is grounded and the base of the emitter is connected to ground through a resistor R47. The emitter of transistor Q8 is also connected through a series combination of a resistor R43 and a diode D19 to the positive input of an operational amplifier U1:3. The negative input of operational amplifier U1:3 is connected to the output of operational amplifier U1:2.

The output of operational amplifier U1:2 is connected to the supply voltage VCC through a resistor R10, and to the gate of a transistor Q5 through a parallel combination of capacitor C9 and resistor R11. The drain of transistor Q5 is connected to the negative motor 15 terminal and to ground through a capacitor C21. The source of transistor Q5 is connected to ground through a resistor R14, and is also connected to ground through reverse biased diode D17.

Positive input terminal to operational amplifier U1:3 is also connected through a resistor R28 to an emitter of a transistor Q2. The voltage source VCC is connected through a resistor R7 to the collector of transistor Q2, and to the base of transistor Q2 through a pair of series connected diodes D8 and D9. The base of transistor Q2 is connected to ground through a resistor R8. The emitter of transistor Q2 is also connected to ground through a capacitor C6 and to the collector of a transistor Q1, the emitter of transistor Q1 connected to ground. The base of transistor Q1 is connected to ground through reverse biased diode D6, resistor R12, a base of a transistor Q6. The base of transistor Q1 is connected to the supply voltage VCC through a series connection of capacitor C7 and a resistor R13. The connection between capacitor C7 and resistor R13 is connected to ground through the parallel combination of a resistor R33 and a reverse biased diode D18.

The supply voltage VCC is connected to the collector of transistor Q3 through a resistor R24 and to the base of transistor Q3 through a series combination of resistor R22 and diode D3. The base of transistor Q3 is connected to ground through resistor R25 while the emitter of transistor Q3 is grounded. The collector of transistor Q3 is connected to ground through a capacitor C11 and to the collector of transistor Q6 through a series combination of resistor R23 and diode D4. The collector of transistor Q6 is connected to ground through capacitor C12 and to the source of transistor Q5 through a resistor R15 and to the positive input of an operational amplifier U1:4

The negative input of operational amplifier U1:4 is connected to ground through the parallel combination of resistor R18 and capacitor C13, and is connected tho the supply voltage VCC through a series combination of resistors R16 and R19. The connection between resistors R16 and R19 is connected to ground through a resistor R17.

The output of operational amplifier U1:4 is connected back though its positive input through a diode D5 and to the base of a transistor Q4 through a series combination of diode D2 and a resistor R20. The connection between diode D2 and a resistor R20 forms a connection labeled CON. The emitter of transistor Q4 is grounded and the collector is connected to the supply voltage VCC through a resistor R21. The collector of transistor Q4 is also connected to the positive input of operational amplifier U1:3 through a diode D7.

The source of transistor Q5 is connected to ground through a series combination of resistor R37 and capacitor C14. The connection between resistor R37 and capacitor C14. Is connected to an operational amplifier U2:3. The supply voltage VCC is connected to the negative input of operational amplifier U2:3 through a series combination of resistors R36 and R35. The connection between resistors R36 and R35 is connected to the source of transistor Q5 through a diode D14, the negative input of operational amplifier U2:3 is also connected to the source of transistor Q5 through a resistor R34. The output of operational amplifier U2:3 is connected through a diode D15 to form the connection labeled CON-C.

The source of transistor Q5 is connected to a positive input of an operational amplifier U2:4 through a resistor R44. Positive input of operational amplifier U2:4 is connected to ground through a capacitor C20. The supply voltage VCC is connected to the source of transistor Q5 through a parallel combination of a reverse biased diode D16 in parallel with a series combination of resistors R39 and R40. The connection between resistors R39 and R40 are connected to ground through a capacitor C15 and into the negative input of operational amplifier U2:4. The output of operational amplifier U2:4 is connected to the connection CON-A through a diode D13, and into the collector of a transistor Q7. The emitter of transistor Q7 is grounded and the base of transistor Q7 is connected to connection CON-B.

A set of values for the circuit of FIG. 19 is as follows: Resistors: R1, 680 ohms; R2, 10 k ohms; R3, 4.7 k ohms; R4, 100 k ohms; R5, 20 k ohms; R6, 100 k ohms; R7, 2.7 k ohms; R8, 1.2 k ohms; R9, Thermistor; R10, 10 k ohms; R11, 510 ohms; R12, 1 k ohms; R13, 390 ohms; R14, 0.0042 megohms; R15, 100 k ohms; R16, 12 k ohms, R17, 100 ohms; R18, 620 ohms; R19, 390 ohms; R20 10 k ohms; R21, 10 k ohms; R22, 4.7 k ohms; R23, 100 k ohms; R24, 2 megaohms; R25, 300 ohms; R26, 82 k ohms; R27, 3 k ohms; R28, 1.8 k ohms; R29, 3.3 k ohms; R30, 3.3 k ohms; R31, 5.6 k ohms; R32, 4.3 k ohms; R33, 1.0 k ohms; R34, 100 ohms; R35, 10 k ohms; R36, 1.5 k ohms; R37, 47 k ohms; R38, 10 k ohms; R39, 1.0 megaohms; R40, 10 k ohms; R41, 1.5 k ohms; R42, 1.0 k ohms; R43, 470 ohms; R44, 1.0 k ohms; R45, 10 k ohms; R46, 10 k ohms; R47, 680 k ohms; and R48, 10 k ohms.

Capacitor values are C1, 470 microfarads; C2, 0.1 microfarads; C3, 102 microfarads; C4, 102 microfarads; C5, 0.1 microfarads; C6, 220 microfarads; C7, 334 microfarads; C8, 220 microfarads; C9, 1500 picofarads; C10, 0.1 microfarads; C11, 3.3 microfarads; C12, 104 microfarads; C13, 473 microfarads; C14, 10 microfarads; C15, 10 microfarads; C16, 330 picofarads; C17, 330 picofarads; C19, 100 microfarads; C20, 473 microfarads; C21, 0.1 microfarads; and C23, 0.47 microfarads.

Preferably the U1 operational amplifiers are part number LM324A, while the U2 operational amplifiers are part number LM324B. Transistors are preferably Q1, 9014C; Q2, 9012; Q3, 9014C; Q4, S8050C; Q5, 1RL3202; Q6, 9014C; Q7, S8050C; Q8, 9014C; and Q9, 9014C.

Diodes may preferably be D1, 1N5404; D2, 1N4148; D3, 1N4148; D4, 1N4148; D5, 1N4148; D6, D7, 1N4148; D8, 1N4148; D9, 1N4148; D10, 1N4148; D12, 4.7V, 0.5W D13, 1N4148; D14, 2.4V, 0.5W; D15 1N4148; D17, 1N4148; D18 7.5V, 0.5W; D19 7.5V, 0.5W; and D20, 1N4148;

In general the association between the circuitry and its function is as follows. The OVER CURRENT PROTECTOR block 207 is associated with components U1:4 and Q4. UNDER VOLTAGE DETECTOR block 209 is associated with Q3. The RATE OF FALL block 214 is associated with U2:3. The RAMP GENERATOR RESTART block 220 is associated with Q1 and Q2. TEMPERATURE SWITCH TIMER block 215 is associated with U2:1 and U2:2. PWM GENERATOR block 219 is associated with U1:1, U1:2 and U1:3. The ROR/ROF PROHIBITOR block 223 is associated with Q8 and Q9.

Figure 20:
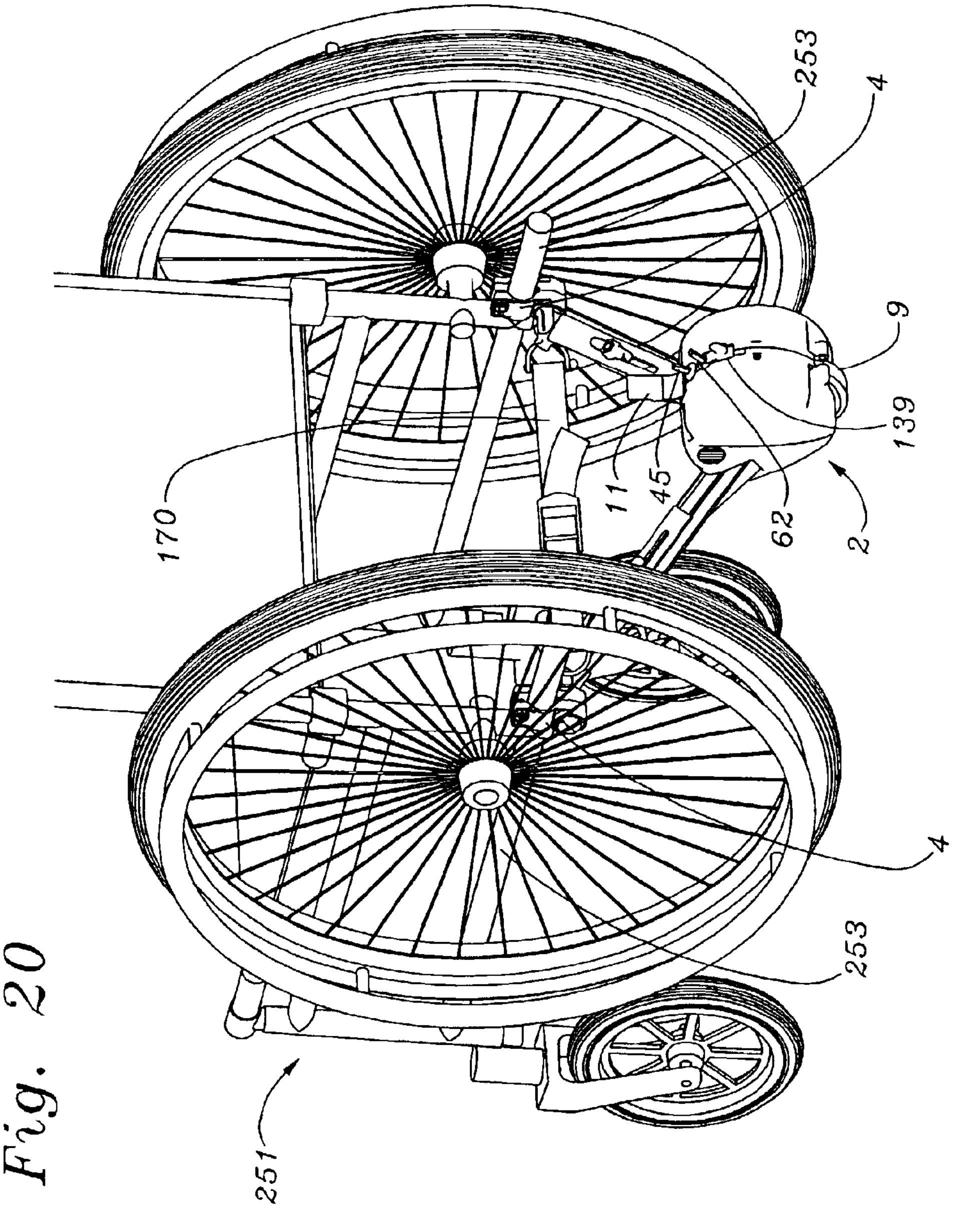
FIG. 20 shows in perspective view the wheelchair drive unit fitted to the horizontal frame of an unfolded wheelchair of a type having a large wheel pivoting higher up on the wheelchair.

Referring to FIG. 20 a detail perspective view of a different style wheelchair 251 shows the clamps 4 of wheelchair drive unit 2 fitted to horizontal frame members 253 as example of a different mounting.

Figure 21:
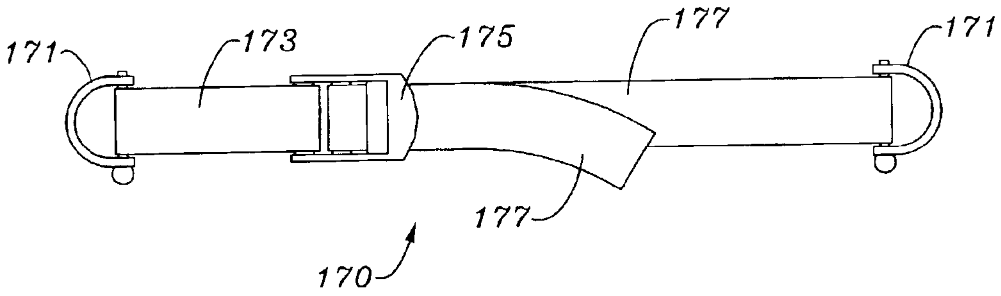
FIG. 21 shows in plan view the tie strap used to limit the opening of the struts.

Referring to FIG. 21 a plan view shows the tie strap 170 used to limit the extent to which struts 5 can open and comprising shackles 171, an adjuster 175 connected to one shackle 171 by a first piece of low stretch material 173 and a second piece of low stretch material 177 that passes through the adjuster 175 and which may be adjusted to reduce the length of the second piece of low stretch material 177 between second shackle 171 and adjuster 175. Shackles 171 are connected to each clamp half strut 6 not shown near the attachment clamps 4.

Figure 22:
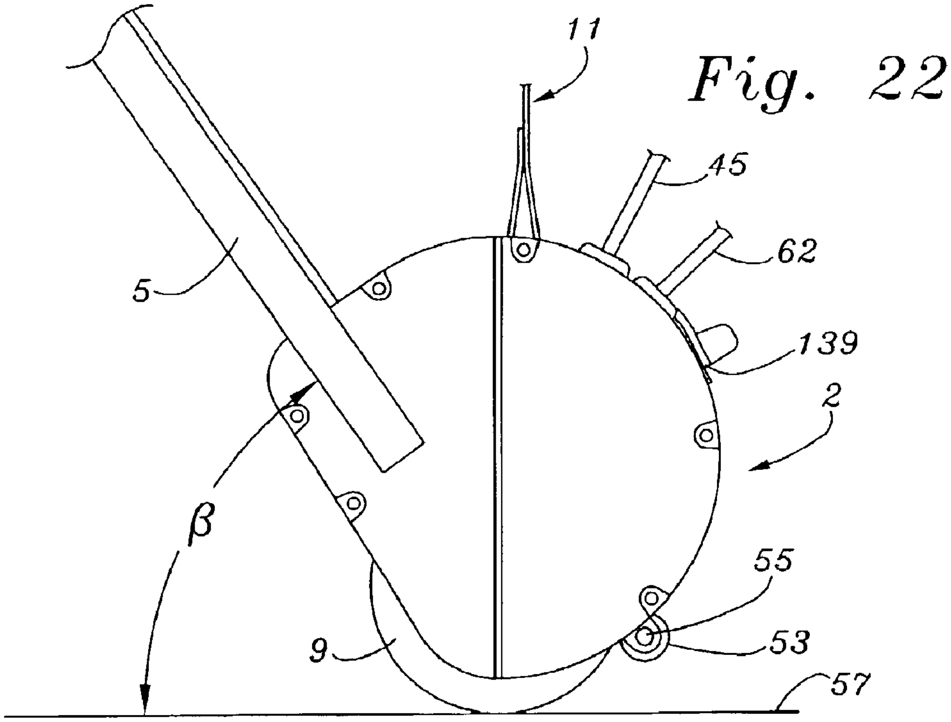
FIG. 22 shows in side elevation the anti under run roller in its normal position.

Referring to FIG. 22 a side elevation of wheelchair drive unit 2 in normal use shows the position of optional anti under run roller 53 which is mounted on anti under run roller axle 55 and in normal use is substantially clear of pavement 57. The normal use position will involve an angle beta between the struts 5 and the ground 57.

Figure 23:
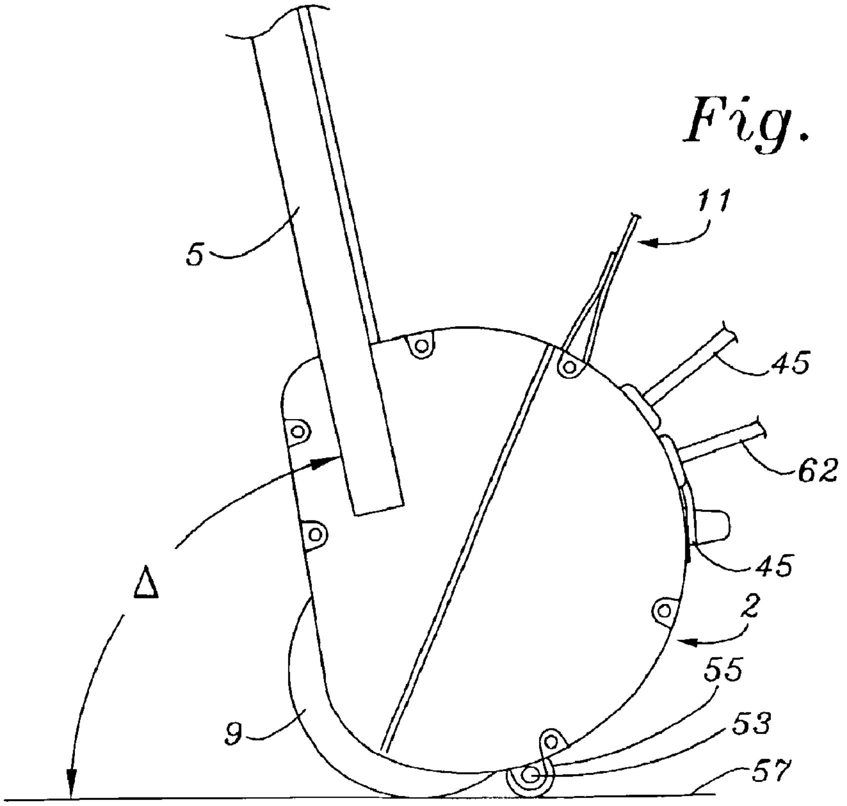
FIG. 23 shows in side elevation the anti under run roller in its operational position, acting to limit the forward movement of the drive unit.

Referring to FIG. 23 a side elevation of wheelchair drive unit 2 in an under run condition in which the wheelchair drive unit 2 has moved to a position in which aforementioned angle beta has increased to angle delta. At the angle delta, the optional anti under run roller 53 then comes into contact with pavement 57 and the contact force between tire 9 and the pavement 57 is reduced. Tire 9 can no longer drive the wheelchair drive unit 2 forward to increase the angle beyond the angle delta This reduction in contact force causes tire 9 to slip against pavement 57 thereby stopping further reduction of angle alpha not shown.

While the present invention has been described in terms of an wheelchair drive unit, and more particularly to a universal applicability device which depends from a wheelchair, the particular structure and system which utilizes a physical and electrical control setup which provides both ease and a universal applicability to the users.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A wheelchair drive device comprising:

a drive support supporting a motor drivably connected to a drive wheel;

a pair of struts each having a first end connected to said drive support and each having a second end for attachment to a wheelchair;

a battery electrically connected to said motor, whereby said second ends of said pair of struts are attachable to said wheelchair to support said drive support in a position to engage said drive wheel on a flat surface to drive said wheelchair forward; and wherein said motor is drivably connected to a radial fan in communication with a vent in an enclosure in communication with an area between said drive wheel and said drive support for pressurizing said drive support.

2. The wheelchair drive device as recited in claim 1 wherein said first ends of said pair of struts each terminate in an interconnected gear set intermeshed with each other for providing matched coordinated angular displacement with respect to said drive support.

3. The wheelchair drive device as recited in claim 1 wherein said drive support includes a mark for orientation of said pair of struts with respect to a wheelchair to enable quick reference positioning of said wheelchair drive device with respect to said wheelchair for optimum orientation.

4. The wheelchair drive device as recited in claim 1 and further including a remote switch, electrically connected to said motor, wherein said drive support includes a mark for orientation of said pair of struts with respect to a wheelchair to enable quick reference positioning of said wheelchair drive device with respect to said wheelchair for optimum orientation.

5. The wheelchair drive device as recited in claim 1 wherein said motor is drivably connected to said drive wheel by a clutch which enables said motor to drivably move said drive wheel in a forward direction when said motor is energized, and which enables said drive wheel to move passively in a forward direction while said motor is not energized.

6. The wheelchair drive device as recited in claim 1 and further comprising a control circuit connected to said motor and to said battery for controlling the operation of said motor under a reaction conditions including least one of an over current condition, a rate of fall condition, a rate of rise condition, a high temperature condition and an under voltage condition.

7. The wheelchair drive device as recited in claim 6 where said control circuit is enabled to react to said reaction conditions by at least one of shutting said motor off, performing a ramped start, and preventing said motor from turning on.

8. The wheelchair drive device as recited in claim 1 further comprising a roller supported by said drive support and positioned to engage the ground surface to inhibit the movement of said wheelchair drive device from running under said wheelchair.

9. A wheelchair drive device comprising:

a drive support supporting a motor drivably connected to a drive wheel;

a pair of struts each having a first end connected to said drive support and each having a second end for attachment to a wheelchair;

a battery electrically connected to said motor, whereby said second ends of said pair of struts are attachable to said wheelchair to support said drive support in a position to engage said drive wheel on a flat surface to drive said wheelchair forward and wherein said motor is drivably connected to said drive wheel by drive transfer pegs, each drive transfer peg engaging a deformable insert positioned to cushion initial torque force of said drive transfer pegs against openings in a hub supporting said drive wheel.

10. The wheelchair drive device as recited in claim 9 wherein said motor is drivably connected to said drive transfer pegs by a clutch which enables said motor to drivably move said drive transfer pegs and said drive wheel in a forward direction when said motor is energized, and which enables said drive transfer pegs and said drive wheel to move passively in a forward direction while said motor is not energized.

11. A wheelchair drive device comprising:

a drive support supporting a motor drivably connected to a drive wheel;

a pair of struts each having a first end connected to said drive support and each having a second end for attachment to a wheelchair;

a battery electrically connected to said motor, whereby said second ends of said pair of struts are attachable to said wheelchair to supoort said drive support in a position to engage said drive wheel on a flat surface to drive said wheelchair forward and further comprising a tie strap having a first end attached to one of said second ends of said pair of struts, and a second end attached to the other one of said second ends of said pair of struts, said tie strap to limit the separation of said second ends of said pair of struts.

12. A wheelchair drive device comprising:

a drive support supporting a motor drivably connected to a drive wheel;

a pair of struts each having a first end connected to said drive support and each having a second end for attachment to a wheelchair;

a battery electrically connected to said motor, whereby said second ends of said pair of struts are attachable to said wheelchair to support said drive support in a position to engage said drive wheel on a flat surface to drive said wheelchair forward;

a lifting strap having a first end attached to said drive support and a second end for attachment to said wheelchair to limit the downward angular movement of said drive supoort with respect to said wheelchair and wherein at least a portion of said lifting strap includes a length of double strapping including at least two spaced apart individual strap members and further comprising a lift actuator for moving individual strap members apart to shorten the overall length of said lifting strap.

13. A wheelchair drive device comprising:

a drive support supporting a motor drivably connected to a drive wheel;

a pair of struts each having a first end connected to said drive support and each having a second end including a pivot for attachment to a wheelchair each said second end quickly removable from said wheelchair pivoting said struts to a predetermined angle with respect to said wheelchair, and wherein said pair of strut second ends each have a tang mounted on a pivot member and interfit with a key on a bracket carried by said wheelchair pivoting said struts to said predetermined angle with respect to said wheelchair; and a battery electrically connected to said motor, whereby said second ends of said pair of struts are attachable to said wheelchair to support said drive support in a position to engage said drive wheel on a flat surface to drive said wheelchair forward.

* * * * *